US012330587B2

(12) United States Patent
Johnson

(10) Patent No.: US 12,330,587 B2
(45) Date of Patent: Jun. 17, 2025

(54) VEHICLE IDENTIFICATION AND SECURE OPERATING PROGRAM

(71) Applicant: The Government of the United States of America, as represented by the Secretary of Homeland Security, Washington, DC (US)

(72) Inventor: Cuthbert Delmer Johnson, Tucson, AZ (US)

(73) Assignee: The Government of the United States of America, represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 18/664,789

(22) Filed: May 15, 2024

(65) Prior Publication Data
US 2024/0383440 A1 Nov. 21, 2024

Related U.S. Application Data

(60) Provisional application No. 63/467,206, filed on May 17, 2023.

(51) Int. Cl.
B60R 25/04 (2013.01)
G06Q 20/32 (2012.01)
(Continued)

(52) U.S. Cl.
CPC .......... B60R 25/04 (2013.01); G06Q 20/325 (2013.01); G06Q 50/265 (2013.01); G06V 40/12 (2022.01);
(Continued)

(58) Field of Classification Search
CPC ............. H04L 2209/84; H04L 63/0823; H04L 63/0861; H04L 67/12; H04L 9/3231;
(Continued)

(56) References Cited

U.S. PATENT DOCUMENTS 9,147,117 B1  9/2015  Madhu et al.
9,305,155 B1  4/2016  Vo et al.
(Continued)

FOREIGN PATENT DOCUMENTS

WO  2016/130168 A1  8/2016
WO  2017/082756 A1  5/2017

Primary Examiner — Dionne Pendleton
(74) Attorney, Agent, or Firm — Lavanya Besch; Robert W. Busby; Kelly G. Hyndman

(57) ABSTRACT

A method to authenticate operators of motor vehicles includes obtaining, based on a driver's license, operator information of an operator of a motor vehicle. The method further includes authenticating, by a Vehicle Identification and Secure Operating Program (VISOP) running on an onboard computer of the motor vehicle, the operator information with a Motor Vehicle Department (MVD). The method determines, based on the authenticating and vehicle identifying information pertaining to the motor vehicle, whether the operator is approved to operate the motor vehicle. The method performs biometric identification to verify that the driver's license matches the operator. The method prevents the motor vehicle from starting, responsive to the operator not being approved to operate the motor vehicle, and allows the motor vehicle to start, responsive to the operator being approved to operate the motor vehicle. The motor vehicle can include the VMAC when wirelessly transmitting operator information and vehicle identifying information for self-reporting to a passing LEO, e.g., to Law Enforcement Officers (LEOs). This enables LEOs to make safer decisions in pulling over a potential suspect to better protect the public and themselves.

24 Claims, 8 Drawing Sheets

(51) Int. Cl.
  *G06Q 50/26* (2012.01)
  *G06V 40/12* (2022.01)
  *G06V 40/16* (2022.01)
  *B60R 25/10* (2013.01)

(52) U.S. Cl.
  CPC .... *G06V 40/172* (2022.01); *B60R 2025/0405* (2013.01); *B60R 2025/1016* (2013.01)

(58) Field of Classification Search
  CPC ......... H04L 63/08; H04L 63/105; G09C 5/00; G08G 1/0112; G08G 1/0133; G08G 1/017; G08G 1/0175; G08G 1/04; G08G 1/096716; G08G 1/096758; G08G 1/096775; G08G 1/096783; G08G 1/096791; G08G 1/161; G08G 1/166; G06Q 10/10; G06Q 10/20; G06Q 2220/10; G06Q 30/016; G06Q 30/0185; G06Q 30/0609; G06Q 40/08; G06Q 50/26; G06Q 50/265; G06Q 30/0607; G06Q 20/384; G06Q 20/401; G06Q 20/4014; G06Q 20/4016; G06N 20/00; G06F 16/2457; G06F 16/258; G06F 21/31; G06F 21/44; G06F 21/577; G06F 21/6218; H04W 12/06; H04W 12/08; H04W 12/009; H04W 12/062; H04W 12/068; H04W 12/084; H04W 12/47; H04W 84/10; G01N 21/88; G07C 5/008; G07C 5/085; G07C 5/0866; G06K 7/1413; G05B 19/042; G05B 2219/24033; B65G 1/1371; A24F 40/53; A24F 40/65
  See application file for complete search history.

(56) References Cited

U.S. PATENT DOCUMENTS

| | | |
|---|---|---|
| 9,436,818 B1 | 9/2016 | Tooley, III |
| 9,672,336 B1 | 6/2017 | Spence |
| 10,013,983 B1 | 7/2018 | Johnson et al. |
| 10,200,397 B2 | 2/2019 | Dhar et al. |
| 10,503,912 B1 | 12/2019 | Kerr |
| 10,970,375 B2 | 4/2021 | Shila et al. |
| 11,005,839 B1 | 5/2021 | Shahidzadeh et al. |
| 11,405,779 B2 | 8/2022 | Boyd et al. |
| 11,564,088 B2 | 1/2023 | Boyd et al. |
| 11,800,352 B2 | 10/2023 | Boyd et al. |
| 2007/0079136 A1 | 4/2007 | Vishik et al. |
| 2007/0214357 A1 | 9/2007 | Baldus et al. |
| 2008/0184037 A1 | 7/2008 | Johnson |
| 2009/0104902 A1 | 4/2009 | Twitchelle, Jr. |
| 2010/0161490 A1* | 6/2010 | Alrabady ............... H04W 12/08 705/50 |
| 2011/0121991 A1 | 5/2011 | Basir |
| 2013/0013553 A1 | 1/2013 | Stibel et al. |
| 2013/0097047 A1 | 4/2013 | Kim |
| 2013/0184898 A1 | 7/2013 | Gersabeck et al. |
| 2014/0143839 A1 | 5/2014 | Ricci |
| 2014/0207537 A1 | 7/2014 | Joyce et al. |
| 2015/0074268 A1 | 3/2015 | Alms |
| 2015/0097703 A1 | 4/2015 | Baur |
| 2016/0055322 A1 | 2/2016 | Thomas |
| 2016/0078581 A1 | 3/2016 | Maher |
| 2017/0032485 A1 | 2/2017 | Vemury |
| 2017/0088098 A1 | 3/2017 | Frank et al. |
| 2017/0187707 A1* | 6/2017 | Miu ...................... H04W 12/06 |
| 2018/0012324 A1 | 1/2018 | Kelts |
| 2018/0012427 A1 | 1/2018 | Ricci |
| 2018/0165655 A1 | 6/2018 | Marcelle et al. |
| 2018/0309592 A1 | 10/2018 | Stolfus |
| 2018/0322413 A1* | 11/2018 | Yocam ................... G06N 20/00 |
| 2018/0336327 A1 | 11/2018 | Wallace et al. |
| 2018/0337917 A1 | 11/2018 | Wallace et al. |
| 2018/0365909 A1 | 12/2018 | Cheng et al. |
| 2019/0036688 A1 | 1/2019 | Wasily et al. |
| 2019/0043148 A1 | 2/2019 | Vemury |
| 2019/0057412 A1 | 2/2019 | Bhattacharjee et al. |
| 2019/0163876 A1 | 5/2019 | Remme et al. |
| 2019/0163887 A1 | 5/2019 | Frederick et al. |
| 2019/0164165 A1 | 5/2019 | Ithabathula |
| 2019/0189007 A1* | 6/2019 | Herman ............... G08G 1/0133 |
| 2019/0213820 A1 | 7/2019 | Sebes et al. |
| 2019/0287111 A1 | 9/2019 | Cvetkovich et al. |
| 2020/0034553 A1 | 1/2020 | Kenyon et al. |
| 2020/0036528 A1 | 1/2020 | Ortiz et al. |
| 2020/0084039 A1 | 3/2020 | Chabanne et al. |
| 2020/0168306 A1 | 5/2020 | Chen et al. |
| 2020/0351089 A1 | 11/2020 | Wentz |
| 2021/0304591 A1 | 9/2021 | Small et al. |
| 2023/0116941 A1* | 4/2023 | Torres ................... H04W 12/47 707/722 |

\* cited by examiner

VEHICLE IDENTIFICATION AND SECURE OPERATING PROGRAM

CROSS-REFERENCE TO RELATED APPLICATIONS

This application is a nonprovisional application that claims the benefit of priority from U.S. provisional application 63/467,206 filed on May 17, 2023, entitled "Vehicle Identification and Secure Operating Program," the disclosure of which is incorporated by reference in its entirety.

STATEMENT OF GOVERNMENT INTEREST

The present invention was made by employees of the United States Department of Homeland Security in the performance of their official duties. The Government has certain rights in the invention.

FIELD

The discussion below relates generally to electronically identifying operators of vehicles and electronically identifying vehicle information.

BACKGROUND

Physical driver's licenses include hard printed information on the license that is carried on-person. Licenses are available in electronic or mobile formats, which provide a snapshot in time of information obtained at the time the person applied and was issued the physical license. This results in outdated information that may not reflect the person's current status to legally operate a vehicle.

Current driver's license information provides identifying information relevant to the person. This information is printed on the physical license and is accessible to officers who access the Motor Vehicle Department (MVD) database. MVD is also referred to as the Department of Motor Vehicles (DMV). Such information includes:
  Picture
  Date of Birth, Sex, Height, Weight, Eye Color, Hair Color
  Current residential address
  Issue date and expiration date
  Any restrictions such as a need to wear corrective lenses, etc.
  Any endorsements such as motorcycle endorsement, Commercial Drive License (CDL), etc.

Law Enforcement Officers (LEOs) perform traffic stops. Traffic stops can involve the following steps: 1) Identify a Vehicle by visual description. 2) Stop Vehicle by observed violations or reported issue and then identify the vehicle by visual physical description for Licenses Plate. 3) Upon identifying a Vehicle requiring to be pulled over, one of the first things the Officer decides is where and when to make the stop. The Officer using all information available to make the decision. The Officer considers the safety of the General Public, themselves, and the operator of the Vehicle. This decision is based on the limited information available of not knowing who is currently operating the vehicle at that time. 4) Before getting out of Officer's vehicle, run visual plates as seen on rear of Vehicle through the National Crime Information Center (NCIS) for any reported issues or concerns with this vehicle as reported by the license plate number. 5) Officer then approaches the stopped vehicle for the first time and asks operator for license, registration, and proof of insurance. 6) Officer then returns to their car to run the operator's license and the vehicle's registration through NCIS, State Criminal Investigations Section (CIS) and MDV. 7) Officer reads reported information on the operator and prints citation and/or returns to the vehicle. 8) Then Officer approaches driver's window for 2nd time. Such a process is inefficient and involves risks to both the general public and the officer.

SUMMARY

In an embodiment, a method to authenticate operators of motor vehicles includes obtaining, based on a driver's license, operator information of an operator of a motor vehicle. The method further includes authenticating, by a Vehicle Identification and Secure Operating Program (VI-SOP) running on an onboard computer of the motor vehicle, the operator information with a Motor Vehicle Department (MVD). The method determines, based on the authenticating and vehicle identifying information pertaining to the motor vehicle, whether the operator is approved to operate the motor vehicle. The method performs biometric identification to verify that the driver's license matches the operator. The method prevents the motor vehicle from starting, responsive to the operator not being approved to operate the motor vehicle, and allows the motor vehicle to start, responsive to the operator being approved to operate the motor vehicle.

Other features and aspects of various embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

DETAILED DESCRIPTION

Figure 1:
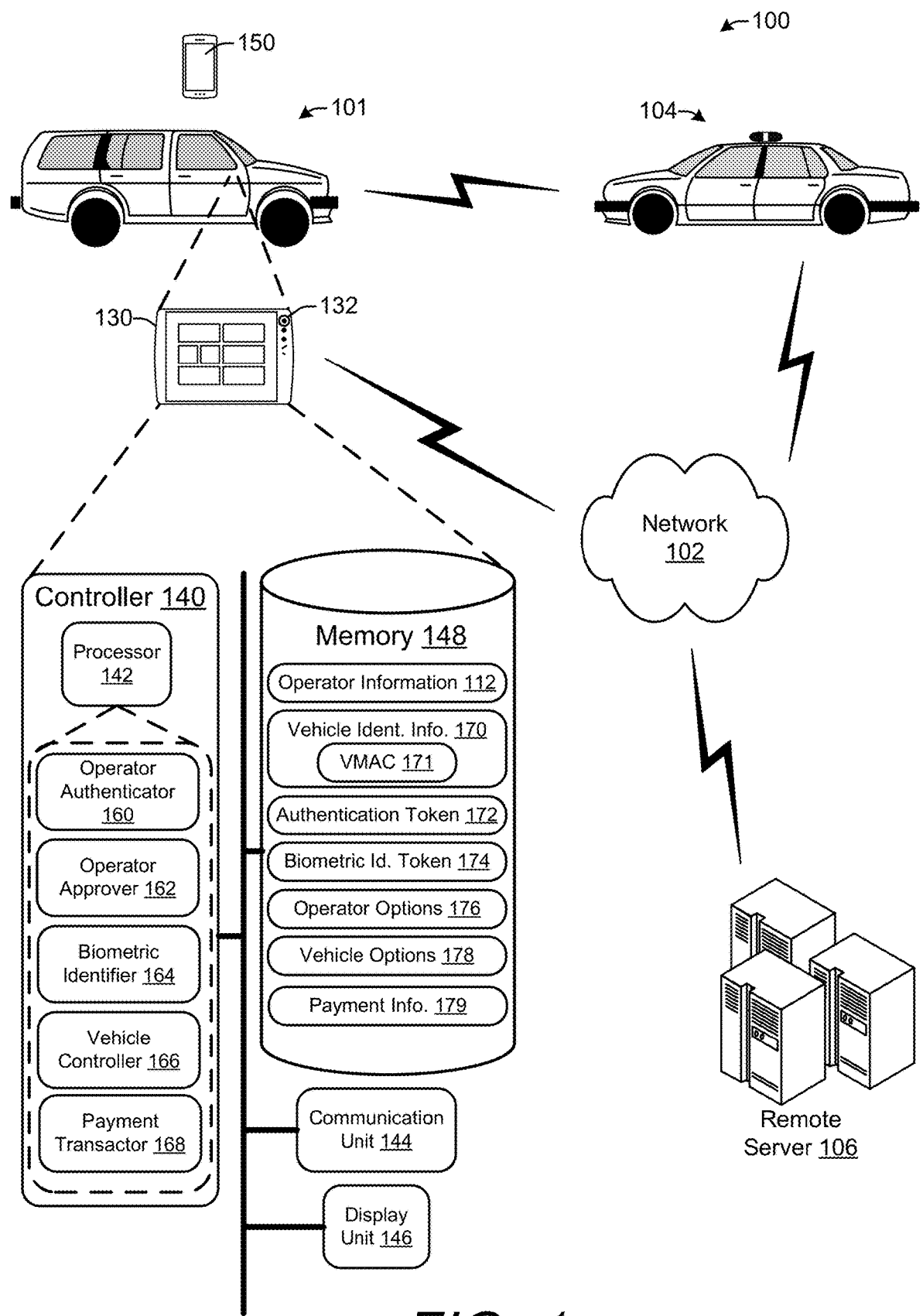
FIG. 1 illustrates a system to authenticate and transmit operator information according to an embodiment.

The Vehicle Identification and Secure Operating Program (VISOP) is a system that can run on a vehicle's onboard computer, which is also referred to as an automotive head unit, vehicle operating system, infotainment system, or the like. The VISOP provides a secure manner of electronically identifying operators of a vehicle and electronically identifying vehicle information. The VISOP system electronically authenticates a potential user's Motor Vehicle Department (MVD) license information and digital picture or other biometric information using biometric identification software. The VISOP also can communicate with the Vehicle's Operating Application (VOA). The VOA can be an application (app) running on a device such as a smartphone, tablet, personal computer, or the like. The VISOP or VOA can determine if a person's authentication is approved to operate a motor vehicle. This helps to prevent an unauthorized user without the proper license (revoked, suspended, incorrect endorsements, etc.), improper usage from a borrower, stolen vehicles, and carjacking crimes. If an operator is not approved, or not authenticated, then the vehicle will not start nor allow the person to operate it.

The motor vehicle's owner can install the VOA as an application on their smartphone, to interact with VISOP software running on the motor vehicle's infotainment computer and handling the functionality for verifying and authenticating the operator. For example, the motor vehicle's owner can use the VOA to submit a request to approve a potential borrower of the motor vehicle. The owner also can use the VOA to access functionality of the VISOP through the smartphone.

The motor vehicle associates communications with a Vehicle Media Access Control (VMAC) address. For example, the motor vehicle can include the VMAC when wirelessly transmitting operator information and self-reporting to a passing LEO, and vehicle identifying information, e.g., to Law Enforcement Officers (LEOs). This enables LEOs to make safer decisions in pulling over a potential suspect to better protect the public and themselves. Additionally, the VMAC identifies color changing and shape changing vehicles to LEOs electronically. The functions described herein can also be used for all types of vehicles, such as but not limited to: Cars, Trucks, Semi-Trucks, Motorcycles, Drones, Boats, ATVs, other off-road vehicles such as Side-by-Side ATVs, e-bikes, scooters, and other vehicles.

Additionally, the Vehicle's Media Access Control (VMAC) address can be used in wireless payments and when transmitting other elected information the owner has approved or stored in the VOA or VISOP. The example systems can be used to pay for parking, tolls, High-Occupancy Vehicle (HOV) Lanes, Drive-Thru food, and many other items if elected/designated in the VOA by the owner.

Dealing with color-changing or shape-changing vehicles poses a challenge for vehicle registration, law enforcement, or first responders, not only in law enforcement, but also in other matters such as when looking for a type of motor vehicle, e.g., during amber alerts (missing children) or silver alerts (missing elderly).

The system described herein involves the use of the fixed VMAC address assigned to the motor vehicle. The motor vehicle can identify itself and its operator, via transmissions including the VMAC and other information such as registration info and the operator's information, which would be obtained in the normal course of a traffic stop of the motor vehicle such as the motor vehicle's registration, the license plate, driver's license, car insurance, and the like. The system can involve a threshold rule of engagement distance and/or reasonable suspicion to pull over the vehicle before obtaining such information from the motor vehicle being stopped. This allows the LEO to use the acquired information to, e.g., access the National Crime Information Center (NCIC) database or state-specific Crime Information Center (CIC; ACIC for the Arizona CIC) to access criminal justice information about the vehicle's operator in order to make a safer decision on where to pull the vehicle over to maximize public safety and LEO safety. The system also allows for other benefits, such as determining whether the motor vehicle is stolen, or associated with an outstanding alert or the like. The system enables the LEO to access such information from the safety of the LEO vehicle without needing to approach the stopped vehicle in person to collect the information.

The VISOP system works similar to the concept of logging in to a computer, but by allowing an operator to start or operate the motor vehicle by using the driver's license, and in some embodiments a biometric authentication, to authenticate and obtain approval of the operator for that motor vehicle. The VISOP thereby enables the motor vehicle to know whether the operator from the driver's license is authorized to drive. If an under-aged child attempts to operate the motor vehicle, the VISOP prevents the motor vehicle from starting. The VISOP of a commercial vehicle can check for a Commercial Driver's License (CDL) before authorizing an operator to operate the commercial vehicle, and check for a motorcycle endorsement before allowing a motorcycle to be started, and so on.

If the vehicle changes color or shape, the VISOP can include the appearance status information when transmitting current status information to the LEO. The VISOP ties the operator to license (e.g., via biometric identification), and ties the vehicle to the VMAC (e.g., by associating the VMAC with transmissions from the VISOP). The VISOP captures physical description information of the motor vehicle, and turns that into electronic information about the motor vehicle that can be wirelessly transmitted to the first responder or LEO interacting with the motor vehicle.

Under certain conditions, the VISOP also can stop a properly started motor vehicle from being used any further. For example, the VISOP can prevent the motor vehicle from continued usage even after a valid authentication, e.g., in the case of an unauthorized user attempting to overtake a vehicle in operation, such as car-jacking where the unauthorized user forcibly removes the authorized operator. The VISOP can perform periodic or continuous re-verifications of the owner information, including performing biometric identification while the motor vehicle is being operated (e.g., after being successfully started).

The VISOP can automatically self-report if the vehicle is in a compromised mode of operation (wrong color, wrong shape, or un-authenticated operator), and/or stolen/tampered with. The vehicle will communicate (e.g., send alerts) during these scenarios via VISOP to LEOs within the operating area of the motor vehicle.

The embodiments described herein enable systems and methods, based on the VISOP or VOA, to provide various features, including: vehicle self-reports to LEO wirelessly by passing within visual distance; transmitting information electronically to immediately alert the LEO when passing within visual distance; wirelessly reporting identifying and descriptive vehicle information; wirelessly reporting vehicle registration information and owner reported issues such as being stolen; wirelessly reporting identifying operator information; and so on.

The embodiments described herein enable LEOs to have a more comprehensive picture of the situation, which enables LEO to better consider when and where to make a traffic stop involving the motor vehicle. The embodiments enable the LEO to determine, via electronic transmissions from the VISOP, various information such as: who is operating the motor vehicle and their legal status (i.e., any warrants or expired/suspended driver's license); status of driver's license; status of vehicle registration; status of vehicle insurance; status of vehicle (e.g., is this a color changing motor vehicle, the current operating color, is this a shape changing motor vehicle, the current operating shape configuration; and so on. This information picture enables the LEO to decide, prior to stopping the motor vehicle and approaching, if the LEO might need back-up, and to determine whether it is likely safe to the LEO and the public to make this traffic stop.

The embodiments enable the LEO to already know the information needed to evaluate the traffic stop, before approaching the vehicle. The LEO can print out a citation as needed, and then approach the stopped vehicle for the first time to issue the citation as needed.

The VISOP of the motor vehicle makes a determination whether the potential operator is authorized to operate the motor vehicle. The VISOP can notify the owner of the motor vehicle, to inform the owner that the operator is trying to operate the motor vehicle.

Embodiments are compatible with the use of an electronic key (e-key). The e-key can be provided in a physical form, such as a card, fob, or other electronically secure format. In an embodiment, a laptop computer runs a version of the VOA, which directs a USB peripheral of the laptop to program the e-key to store an authorization token from the MVD onto the e-key. When the physical e-key is used to access the motor vehicle, the VISOP of the motor vehicle will read the e-key and receive the authorization token. The authorization token enables the VISOP to authorize the key holder without needing to communicate with the MVD to obtain the authorization, e.g., in areas where network services are not available. The VOA can assign limitations and features to the stored authorization token, such as time limits for valid dates the authorization token can be used. The additional limitations can be set by the owner when using the VOA, such as parameters or limitations related to how the operator may use the motor vehicle (e.g., number of times the operator may use the motor vehicle, a duration of each usage, and so on).

FIG. 1 illustrates a system 100 to authenticate operators according to an embodiment. The system 100 includes a VISOP 130, in communication via network 102 with LEO 104 and remote server 106. The VISOP 130 also can establish direct vehicle-to-vehicle communications with the LEO 104. The VISOP 130 can be an integrated processing system of the motor vehicle, and can also be implemented as a smartphone, a laptop, a tablet, or other computing system installed in the motor vehicle 101. VISOP 130 includes controller 140 coupled via a bus to memory 148, communication unit 144, and display unit 146. The controller 140 includes a processor 142 to execute operator authenticator 160, operator approver 162, biometric identifier 164, vehicle controller 166, and payment transactor 168.

Remote server 106 represents databases or services with which the VISOP 130 can communicate to authenticate or verify information pertaining to the operator or the motor vehicle. Remote server 106 includes the MVD, criminal databases, information databases, and the like for hosting authentic reference information regarding operator status, vehicle status, license information, vehicle registration information, criminal information, and the like. Such systems can include law enforcement servers that enable the VISOP 130 to authenticate operators and vehicles, and determine whether an operator is allowed to operate the motor vehicle 101. The remote server 106 also can include payment system servers, to enable the VISOP 130 to use payment information of an owner to process payment transactions via the motor vehicle 101.

The memory 148 is associated with operator information 112, vehicle identifying information 170 (which can include VMAC 171), authentication token 172, biometric identification token 174, operator options 176, vehicle options 178, and payment information 179.

The operator information 112, and other available information, includes information that is needed when LEO performs a traffic stop of the motor vehicle 101 (e.g., license and registration). The operator information 112 can include a password, a personal identification number (PIN), a name, an address, a date of birth, a social security number, a driver's license number, and so on. A vehicle owner can use a smartphone to create an account on the smartphone's VOA application 150, and provide operator information 112 for themselves, which the VOA 150 transfers to the VISOP 130 for storage in memory 148. The VISOP 130 can then use the operator information 112 to authenticate the owner when the owner is the operator of the motor vehicle 101. If an unauthorized operator attempts to use the motor vehicle 101, the VISOP 130 will request information from the unauthorized operator, compare it to the stored operator information 112, and determine that the unauthorized operator does not match and prevent the motor vehicle 101 from starting.

The Vehicle Identifying Information 170 includes information pertaining to the motor vehicle 101, such as fixed information (e.g., VIN number, VMAC 171, and the like) and variable information (e.g., color, shape, and the like for a color-changing shape-changing vehicle). The vehicle identifying information 170 can include an indication that the motor vehicle is color changing, a current color of the motor vehicle, an indication that the motor vehicle is shape changing, or a current physical configuration of a shape of the motor vehicle, motor vehicle make, motor vehicle model, motor vehicle manufacture year, motor vehicle color, motor vehicle Vehicle Identification Number (VIN), motor vehicle onboard computer Media Access Control (MAC) address, motor vehicle issued license plate number, motor vehicle current owner's insurance, motor vehicle current owner's registration card, or motor vehicle current registration license plate sticker. The VISOP 130 can transmit the vehicle identifying information 170 to the LEO 104 during a traffic stop, to enable the LEO 104 to assess the motor vehicle 101. For example, the transmitted vehicle identifying information 170 enables the LEO 104 to determine whether the motor vehicle is compromised by showing a mismatch between the reported vehicle identifying information 170 as compared to the official registration records of the motor vehicle 101.

The authentication token 172 indicates whether the identity of an operator has been authenticated. The VISOP 130 can submit the operator information 112 to the MVD (remote server 106) with a request for authentication, and obtain the authentication token 172 in response, indicating that the operator information 112 is authentic. In an embodiment, the owner pre-authenticates an operator by using the VOA 150 (running on a smartphone, computer, or the like) to collect the operator's information 112 and submit it to the MVD for authentication. If authenticated, the MVD returns the authentication token 172 to the VOA 150, indicating that the operator information 112 is authentic. The VOA 150 then communicates with the VISOP 130 to transmit the authentication token 172 from the VOA 150 to the VISOP 130.

The biometric identification token 174 is obtained by the VISOP 130 as a result of performing biometric identification. In an embodiment, the VISOP 130 uses an in-vehicle camera to perform facial recognition of the operator, comparing the sensed image of the operator to a stored image of the operator read from a driver's license or obtained via network 102 from MVD records. The biometric identification token 174 indicates whether the facial recognition was successful. In an embodiment, the vehicle includes a fingerprint reader, which the VISOP 130 uses to compare a sensed fingerprint obtained from the operator with a stored fingerprint read from a driver's license or obtained via network 102 from MVD records. In an embodiment, the owner pre-authenticates an operator by using the VOA 150 (running on a smartphone, computer, or the like) to collect the operator's biometric information (photo, video, fingerprint, or the like) and submit it to the MVD for authentication. If authenticated, the MVD returns the biometric identification token 174 to the VOA 150, verifying that the operator matches the operator information 112. The VOA 150 then communicates with the VISOP 130 to transmit the biometric identification token 174 from the VOA 150 to the VISOP 130.

Operator options 176 include options pertaining to one or more operators. For example, the operator options 176 can include specific time limitations for when that operator is allowed to start or operate the motor vehicle 101.

Vehicle options 178 include options that the owner can specify that affect usage of the motor vehicle 101, such as whether to use standard authentication (license and biometric) or enable two-factor authentication (license and biometric, in addition to a PIN or password). Other vehicle options 178 include a starting lock option, no authentication authorization, bypass start option, storing lock option, running options, re-authentication options, emergency shut-off option, stored e-key settings, vehicle maintenance mode, valet parking mode, and other as set forth below.

Payment information 179 includes information that the owner voluntarily elects to submit and store in the VOA 150 or VISOP 130 for processing payments wirelessly via the motor vehicle 101. The VISOP 130 includes wireless payment infrastructure to process payments for parking, tolls, High-Occupancy Vehicle (HOV) Lanes, Drive-Thru food, and the like. In an embodiment, the VISOP 130 uses communication unit 144 to transmit the payment information 179 directly, or via network 102, to a remote server 106 providing payment processing.

The VISOP 130 includes one or more communicatively coupled communication units 144, processors 142, display unit 146, and memory 148. The communication unit 144 is representative of one or more devices able to communicate information to or from other devices and components including in instances those included in or external to the system 100. Example communication units 144 include but are not limited to wireless modems (such as an 802.11 compliant unit), wired (e.g., Ethernet-ready) or other such communication interfaces, or a cellular communication transceiver. Example 802.11 compliant modems or cards include but are not limited to those compliant with 802.11n, 802.11ac, 802.11ad, 802.11ah, 802.11aj, 802.11ax, and the like wireless local area network standards promulgated by the Institute of Electrical and Electronics Engineers (IEEE), New York, New York.

Although a single processor 142 and memory 148 are shown, the VISOP 130 can be constructed with multiple processors and memory. The processor 142 is representative of hardware that is capable of processing computer executable instructions, such as a central processing unit that executes a program of instructions. In embodiments, the processing unit (processor 142) implements an operating system which is a set of instructions that allows the processor to perform specialized instructions according to a program run on the operating system or processor platform.

Local memory 148 is representative of a wide variety and types and combinations of memory suitable for storing information in an electronic format. Example memory includes but is not limited to random access memory (RAM), hard disk memory, removable medium memory, flash storage memory, and other types of computer-readable media including non-transitory data storage.

In embodiments, the controller 140 is representative of hardware or software that is constructed to function as described in this disclosure. For example, the controller 140 is a combination of software (such as a program of instructions that is stored in local memory) that is useable by the processor 142 to provide the described capabilities and functions, such as when the embodied instructions are executed by the processor 142 included in the VISOP 130. As illustrated and for ease of understanding, the controller 140 includes the processor 142 and the various illustrated modules, and other logic or features described herein. While shown and described as individual modules, the supporting hardware or software can be configured as an integrated program of instructions to provide the described functionality, such as through the use of application program interfaces (APIs) that permit individual programs to interface to one or more other programs and provide one or more graphical user interfaces (GUIs) output on a display unit 146 to a user to access information or exercise control over the computing system such as VISOP 130 including a visual display output.

The VISOP 130 executes the various modules associated with processor 142. The VISOP 130 executes operator authenticator 160 to determine whether the operator information 112 presented to the VISOP 130 is legitimate and authentic. For example, the VISOP 130 is coupled to a driver's license reader that electronically obtains the operator information 112 from a driver's license presented to the driver's license reader, including information such as operator's name, date of birth, and the like. The operator authenticator 160 coordinates the VISOP 130 to use the communication unit 144 to transmit the operator information 112 to remote server 106 corresponding to the MVD, requesting that the MVD authenticate the operator information 112. The operator authenticator 160 receives an authentication token 172 from the MVD indicating whether the operator information 112 is verified as authentic.

The VISOP 130 executes operator approver 162 to determine whether the operator is qualified or allowed to operate the motor vehicle 101. For example, the operator approver 162 checks whether the operator is of sufficient age and has the correct driver's license endorsement corresponding to the type of motor vehicle 101. The operator approver 162 can also consult an internal database stored in memory 148 of the VISOP 130 including the operator options 176 and vehicle options 178, to determine if those options are consistent with allowing the operator to operate the motor vehicle 101. This includes, e.g., checking for stored options set by the owner, such as whether a given operator is limited in how they can operate the motor vehicle and how far the borrow can drive the vehicle or to which locations the borrow can operate the vehicle. The owner can configure such operator options 176 or vehicle options 178 using the VOA 150 running on their smartphone, for example.

The VISOP 130 executes biometric identifier 164 to determine whether the operator in the vehicle corresponds to the information presented for that operator. For example, the biometric identifier 164 can compare captured operator information such as facial image or fingerprint, obtained from in-vehicle sensors, to the corresponding information from the MVD (whether accessed from remote server 106 or directly read from a driver's license).

The VISOP 130 executes the vehicle controller 166 to communicate with the onboard computer of the motor vehicle 101, to direct the motor vehicle 101 to start or stop, or control other features of the motor vehicle 101. For example, the VISOP 130 executes the operator approver 162 to determine that the operator has set an age limit that the operator does not satisfy, and accordingly executes the vehicle controller 166 to direct the onboard computer of the motor vehicle 101 to not start the motor vehicle 101.

The VISOP 130 executes the payment transactor 168 to process payments via the motor vehicle 101. For example, the payment transactor 168 stores and manages transmission of payment information 179, which includes information that the owner voluntarily elects to submit and store in the VOA 150 or VISOP 130. The payment transactor 168 processes payments using wireless payment infrastructure, including communication unit 144, to transmit the payment information 179 directly, or via network 102, to a remote server 106 providing payment processing.

System 100 enables an operator to get in the motor vehicle 101 and receive real-time authentication via network 102, e.g., using a cellular telephone network infrastructure, to which the motor vehicle has connectivity (e.g., the communication unit 144 including a dedicated cellular telephone account) for authenticating operator information or vehicle information. The VISOP 130 obtains authentication by reading the operator's driver's license to obtain operator information 112, and then authenticating the operator information 112 with the MVD. The VISOP 130 also verifies biometric identification of the operator, e.g., by turning on an in-vehicle camera to perform facial recognition, or by activating a fingerprint reader to perform fingerprint recognition. The VISOP 130 also can check the vehicle identifying information 170 to determine any requirements needed to operate that type of vehicle, and check the operator information 112 to confirm that the operator is qualified to operate the vehicle (e.g., by verifying that the operator's driver's license includes the appropriate type of endorsement). The VISOP 130 can use communication unit 144 to verify and authenticate the operator information 112 or vehicle identifying information 170, including the use of network 102 to communicate.

The VISOP 130 can pull a reference image from a driver's license, for use in performing facial recognition biometric identifications. The VISOP 130 can perform the facial recognition locally using the biometric identifier 164 of controller 140, without needing to use network 102. The VISOP 130 can obtain a local live image using camera 132, and use the biometric information available on the driver's license that the VISOP 130 reads locally in the motor vehicle 101. Accordingly, the VISOP 130 does not need to transmit or receive data to or from the MVD (or other remote server 106) in order to perform biometric identification to verify that an operator attempting to operate the motor vehicle 101 matches the driver's license received at the VISOP 130. The results of the biometric identification can be stored as a biometric identification token 174. The VISOP 130 can transmit or receive the biometric identification token 174 to or from the VOA 150 operating on another device, such as the owner's smartphone or an e-key.

The VISOP 130 can perform vehicle authentication for many types of applications and vehicles, such as: self-driving mode, cars, trucks, semi-trucks, trains, drones, motorcycles, and off-road vehicles such as dirt bikes, all-terrain vehicles (ATVs), utility task vehicles (UTVs) and side-by-sides (SxSs). The VISOP 130 is compatible with physical licenses or electronic licenses (e-licenses), for vehicles that require the operator to have an MVD driver's license or endorsement. A physical license or E-licenses include compatibility with electronic readers, based on a chip reader, a tap feature based on radio frequency identification (RFID) or similar, or a wireless feature that can read the information from a distance greater than RFID (e.g., based on Wi-Fi, Bluetooth, or similar wireless technologies). The VISOP 130 includes communication unit 144 that enables the motor vehicle 101 to electronically connect and access the information identified on the operator's current driver's license. This enables the VISOP 130 to use information securely, enabling vehicle operations based on the current authorized physical license or e-license status via the VISOP or the VOAs Authentication Token Process. The VISOP 130 also can authenticate the operators license to access the state's database at the Motor Vehicle Department (MVD) electronically, prior to operation of the vehicle. The VISOP 130 reads the physical license or e-license and can authenticate the operator's current privileges as indicated up to date at the MVD, to allow via an authentication token or not allow vehicle operation by the operator.

A state's Motor Vehicle Department (MVD) requires certain operator information or vehicle information in order to issue a printed physical driver's license, or e-license which can be issued electronically and authenticated electronically, in real-time or near real-time. The VISOP or VOA License Authentication Token reflects up to date current information via VISOP and VOAs verification process, even if the physical or e-license of the operator's required information or status changes over time.

The VISOP 130 can authenticate the e-license in the motor vehicle 101 in real time when the operator attempts to operate the motor vehicle 101, using a contact card reader connection/insertion, or a proximity tap connection card reader, or a wireless read connection to obtain the operator information 112 from the driver's license. The VISOP 130 can include a card reader pad in a physical card reader location where the operator can insert or tap the physical license into the card reader in the motor vehicle at the time of attempting to operate the vehicle. By inserting the physical license into the reader, the VISOP 130 then can seek real time authentication from the MVD of the operator information 112 via network 102. The VISOP 130 reads the chip on the physical license and connects real-time to the MVD to authenticate via the vehicle's connected Wi-Fi or cellular network services. The MVD responds to the vehicle's request for authentication with either an 'approval' or 'denial' of authentication of the requested user's license. This enables system 100 to check if the operator's driver's license status or verification has been revoked, prior to the motor vehicle allowing itself to be started/driven.

The VISOP 130 can check for authorization in view of various issues, and selectively control the operator's access to starting or operating the motor vehicle 101 accordingly. For example, the VISOP 130 can check for: correct license endorsements to operate this type of motor vehicle; class G licenses for 16-18 year olds; valid age, time of day, other operator requirements to operate, such as a minor operator driving with others in the vehicle after a certain time of day, or an authorized trainee license; driving with a permit; an authorized licensee chaperone in the passenger seat who has been authenticated as a valid license holder, at least 21 years old or per states driver permit requirements; and so on.

The VISOP 130 also can use a wireless in-car authentication option having a small radius to wirelessly read the operator information 112 from the physical or e-license chip. The physical or e-license can therefore be stored in a wallet or purse and read by the VISOP 130 via a wireless function when the operator enters the driver's seat of the motor vehicle 101. The VISOP 130 can allow a range limit to be set, as a security setting in the owner's settings of the Vehicle Operating Application (VOA). The range limit can be set to 'on persons,' where the range will be limited to the range of an operator having the license on the person or in a purse in the front seat of the vehicle in which the operator is trying to operate. The range limit can be set to the physical or e-license inside of vehicle, in which case the range will be limited to detecting the wireless capable license inside of the vehicle and in the immediate vicinity of the driver seat before it can be read wirelessly. With this setting, the vehicle will detect the license outside of the vehicle, and the potential operator must be inside of the vehicle, or must be in the driver's seat only.

The VISOP 130 also can authenticate the operator information 112 in advance, prior to the operator attempting to operate or before entering the motor vehicle 101. The VISOP 130 supports the use of authentication tokens, such as authentication token 172 and biometric identification token 174. A vehicle owner, or other trusted user, can register VOA software with the vehicle and VISOP 130, and be granted permission to access the VOA associated with the motor vehicle 101 (the VOA 150 includes and has access to the vehicle identifying information 170). The owner or trusted user can use the VOA 150 to perform remote pre-authentication of another operator. The owner or trusted user enters the operator's operator information 112 into the VOA 150. The VOA 150 then obtains remote pre-authentication of the operator information 112 from the MDV, including authentication token 172. The VOA 150 can then transfer the authentication token 172 to the VISOP 130, or another trusted device such as an e-key for the vehicle.

The VISOP 130 runs a pre-installed biometric identification, such as fingerprint or facial recognition, to compare the physical or e-license digital photo or fingerprint data to the corresponding information obtained live from the operator sitting in the driver's seat of the vehicle attempting to operate the motor vehicle 101. The VISOP 130 can use a built in or after-market vehicle facial USB Camera, such as camera 132, to view the operator, and compare the operator's appearance to the stored digital picture on the physical license chip or e-license. In an embodiment, the VISOP 130 can obtain the biometric identification token 174 from a smartphone or similar external device that performed the facial recognition or fingerprint recognition and generated the token using the external device's hardware.

The VISOP 130 can be embodied as a capability kit, which can be installed in older models of motor vehicles 101. The capability kit includes a card reader, such as a vehicle tap access pad, to read a wireless license that is physically tapped or otherwise presented within reading range. The capability kit can be powered via a battery or power cable connected to charging options such as the vehicle's direct electrical system, a cable charging to the vehicle's universal serial bus (USB) or other electrical plug, or the vehicle's cigarette lighter charging plug. The capability kit includes other hardware, cabling, and directions on how to connect the capability kit to the vehicle's onboard computer or the vehicle's ignition system, in order to determine vehicle information or control whether the motor vehicle 101 can be started or prevented from starting. The capability kit can include a small software box, digital antenna, portable transponder for self-reporting to LEOs, portable camera for facial recognition, and portable finger print reader. The small software box also contains the software and hardware illustrated in FIG. 1 to run the applications the VISOP 130 performs, to read the physical license chip or the e-license, connect to the on-board systems, transmit and receive, and connect the ignition system to lock or unlock the motor vehicle 101. The capability kit can include a card reader that has adjustable sensitivity for reading driver's licenses, such as being limited to within a two-foot radius, or limited to a radius that may be adjusted based on an owner's profile settings in the VOA.

The Vehicle's Operator Application (VOA 150) is provided as an application that can work with and communicate with the VISOP 130. The VOA 150 can be accessed via a phone app or via a uniform resource locator (URL) website. The VOA 150 includes settings and information. Additionally, the VOA 150 includes several elective settings, information, and an electronic wallet for various payment options and configurations. The VOA 150 can provide a link to reading the physical license chip or e-license and verifying the operator information 112 or vehicle identifying information 170, to ensure such information is current and authenticated with the MVD.

The owner has access to the VOA 150 in which they set-up a security profile. This profile has several security and notification features that can be set up. The owner can type the license number into the VOA 150 app, talk to potential operators to obtain their operator information 112, and load the operator information 112 for that potential operator onto the app. The owner can thereby use the VOA 150 app to authenticate another operator, including multiple other operators. The VOA 150 app receives the operator information 112, which can include the potential operator's license number and phone number. The VOA 150 then can contact that potential operator to asks that person if they authorize the owner to access or approve them. If the potential operator grants permission, the VOA 150 receives the operator information 112 and performs the authentication with the MVD to obtain the authentication token for that potential operator. The authentication token 172 indicates that the potential operator is authorized for operating the vehicle, with any constraints. The VOA 150 can transfer the authentication token 172 to the VISOP 130 for use in authenticating the potential operator for vehicle operation, including for use in performing the biometric identification to verify the operator at the time they are attempting to operate the motor vehicle 101.

The VOA 150 allows for customizing operator options 176 or vehicle options 178. For example, the owner can use the VOA 150 to set a term for the authentication token 172, or set the authentication token 172 to unlimited without needing to be refreshed. The VISOP 130 similarly can be used to adjust such options. Embodiments allow for adjustable customizations to the options, including whether to set a specific time limit or other terms of use on a given potential operator(s). Such limits or terms include setting a one-time use for a first operator, whose token expires after a first use. The embodiments support monitoring usage of the motor vehicle 101, e.g., via global positioning system (GPS), speed monitoring, distance mileage, location monitoring, and the like, to ensure that the operator complies with the pre-approved vehicle usage indicated in the options associated with the authentication token 172. The monitoring of speed, distance, mileage, and location can be done by pulling information from the vehicle's onboard computer or the vehicles odometer or via a GPS, the VISOP, or the VOA by the owner on the phone app or laptop app. Embodiments can request permission from the potential operator to re-authenticate them after a given time period, to re-submit the operator information 112 of the potential operator to the MVD for authentication to confirm their information is still valid for operating the motor vehicle 101. An embodiment can allow a potential operator 30-day use of the motor vehicle 101, and if the potential operator does not use the motor vehicle, then the VOA 150 can provide a reminder to ask the potential operator to reauthenticate. The potential operator can respond to the VOA 150 reminder, and direct the VOA 150 to decline and delete the authentication token 172 pertaining to the potential operator.

The potential operator can communicate with the VOA 150 app or the VISOP 130 of the motor vehicle 101 when the VOA 150 app or VISOP 130 requests information or permission from them. However, the borrowing is initiated by the owner, preventing potential operators from making unsolicited requests to borrow any owner's motor vehicle 101. The owner initiates proceedings and can issue rights to potential operators, but control remains with the owner who decides whether to grant or rescind limited privileges to potential operators. In an embodiment, an owner can configure to the VOA 150 and VISOP to allow a potential operator to sub-let the motor vehicle 101 to other potential sub-operators.

The owner can send a potential operator a request, via a cell phone text or email approval, for the potential operator to respond and grant access to the potential operator's license information held in the MVD and to store the authenticated token in the VOA and VISOP. The potential operator must approve this request before the owner can submit the potential operator's information to MVD and store any information in the VOA and VISOP. If the potential operator does not grant this permission, then they will not be authenticated to borrow this vehicle.

The VOA 150 and VISOP 130 have additional, tailorable options the owner can elect, including:

Starting Application Settings: The Vehicle's Operator Application (VOA), if set-up by the owner, can enable several security settings: Two-Factor Starting Authentication: The owner can also require more secure requirements before the potential operator is authorized to start the vehicle such as a 'Two Factor Authorization.' Factor 1: the physical license (i.e., either inserted into the dashboard card reader or read wireless 'if vehicle has that system and it's installed); and Factor 2: After the physical license is digitally recognized by the vehicle, the vehicle will require either a pin or password.

Starting: Starting Lock Option: The owner can set a security starting option to where the vehicle will only start when their specific physical license or E-License (as the owner) is present and read. The vehicle will only start with their physical license or E-Licenses.

Starting Lock Option: The owner can set a security starting option to where only a certain person which is pre-loaded into the app can start the vehicle when their physical or E-License is present.

No Authentication Authorization: If the owner does not wish certain people to ever drive their motor vehicle, they can go into the Vehicle's Operation App (VOA) and not authorize them as a user.

No Signal or By-Pass Start Option: If a vehicle's physical or E-License software system, antenna, physical device is broken, or no signal access, the vehicle E-Key can be loaded with an E-License data and authenticated via another Wi-Fi source to the MVD. The physical key the motor vehicle came with will be chipped which will allow loading of the physical licenses or E-License information and can remotely authenticate using an alternative internet or Wi-Fi source other than the vehicle to authenticate to MVD. The owner of the vehicle will have their E-License loaded onto the E-Key (a key with a chip on it.) The Key can then be used in the motor vehicle to start the motor vehicle in a by-pass situation.

Storing Lock Option: The owner can set the security starting option to 'storage mode.' In this mode the vehicle will start when the owner unlocks the storage mode on their application (VOA). The vehicle will not start regardless of a physical license or E-License being presented in any manner in the vehicle.

Running Options: The owner can set options to what happens when an authenticated operator exits the vehicle with the vehicle running.

Default: A default will be for the vehicle to shut-off automatically,

Re-Authenticate: An option can be set to allow the vehicle to remain running. However, before it can be driven the software application would require re-authentication if a two-step authentication option was enabled by the owner.

Emergency Shut-Off: If the current operator is pulled out of the motor vehicle while the motor vehicle engine is running, the vehicle will go into an emergency shut-off mode and will not restart until the physical license or E-License has been re-authenticated.

Stored E-Key Settings: The owner has the option for each respective stored E-Key to set specific periods of time for which that E-Key can operate the vehicle. The owner pre-loads 'Authorized Usage Time/Window' in their Vehicle's Operators Application (VOA). This will prevent a person from using the vehicle when the owner has not approved just because their physical license or E-License authentication token is loaded onto the E-Key. If this operating window is set-up, the E-Key, if stolen, will not allow the vehicle to operate.

Vehicle Maintenance Mode: The owner has the option via the VOA to put the vehicle into 'maintenance mode.' When in this mode, the VOA or VISOP will not require an authentication to MVD nor a remote authentication of an physical license or E-License on the E-Key. It will allow the maintenance facility to locally drive the vehicle for maintenance activities. The owner will receive VOA notifications anytime the maintenance shop moves the vehicle, to ensure the vehicle has not been stolen.

Vehicle Valet Parking Mode: The owner has the option via the VOA to put the vehicle into 'valet parking mode.'

Transition of Vehicle Ownership: Anytime an owner sells the vehicle, they will be required to clear the cache for both the VOA and E-Key. The new owner will have to go into the VOA and re-sync the E-Key, their physical license or E-License and set all required or optional security/notification features in the VOA.

Facial Recognition: The VOA or VISOP 130 will access the onboard camera to recognize the operator matches the authenticated token of the physical license or E-License. If these two do not match, the vehicle will not start and will notify the owner and execute any other pre-notification in case of an emergency the owner has set-up in their app. The VISOP 130 allows for a photo taken via a phone app to be used for authentication in facial recognition as well.

Fingerprint Reading: The VOA or VISOP 130 will access the onboard fingerprint reader to recognize the operator matches the authenticated physical license or E-License. If these two do not match, the vehicle will not start and will notify the owner and execute any other pre-notification in case of an emergency the owner has set-up in their app. The VISOP 130 allows for a fingerprint to be taken via a phone app to be used for authentication in of fingerprints as well.

Notifications: The owner can set specific options in the Vehicle's Operators Application (VOA) for notifications, as follows.

Attempts Notices: The owner receives a notification on all 'Attempts to start the vehicle.' If the owner has set an alert via the vehicle's onboard application (VOA) or VISOP 130, and anyone tries to operate the vehicle, the vehicle will send an alert notification to the owner that an unauthorized person tried to operate the vehicle, with the date, time, location, and will identify to the owner who tried operating if they had a license the vehicle could read. If the person did not have a license and was simply trying to steal the vehicle, it will notify the owner that an unauthorized person is trying to access the vehicle at this time without an authorized license.

Who Notices: the notification indicates which physical license or E-License was used in the attempt.

Optional Notifications: The owner can elect to send a notice to emergency services such as 911, or to another approved person(s).

Kids driving at night: The owner can select a setting to not authorize teenage or new drivers to operate their vehicle after a certain hour. Some States have such restrictions for newly licensed operators.

The system 100 provides LEO 104 with improved access to operator information 112 and vehicle identifying information 170, enabling LEO 104 to better determine whether something is off or missing about the motor vehicle 101 (such as why the motor vehicle 101 is not transmitting the VMAC 171, why is the motor vehicle 101 transmitting visually incorrect information, why is there an altered driver's license reader to alter or create false authentication, and so on. The improved access also improves safety for traffic stops, providing LEO 104 with information to immediately inform the LEO 104 whether there is an authenticated operator in the motor vehicle 101. If not, the LEO 104 can take extra precautions when performing the traffic stop. System 100 makes law enforcement interactions safer, and minimizes danger to the LEO and the general public. System 100 informs the LEO 104 whether to, e.g., perform the traffic stop by pulling over the motor vehicle 101 in an extra safe area to avoid risk of bystander injury in a potential shootout, for example.

The system 100 enables LEO 104 to receive various types of officer alerts. The VISOP 130 is configured to communicate information about the motor vehicle 101 and its operator. The LEO 104 includes an officer's system that displays the alert to the LEO 104. The officer alert includes various types of concerns the officer may use to decide whether to engage the motor vehicle 101 and make a vehicle stop, including: Expired License, Stolen License, Revoked License, Suspended License, Missing License Endorsement, Incorrect License Endorsement, Warrant(s), Expired Vehicle Registrations, Stolen Vehicle, VMAC Information not Matching, VMAC not transmitting an 'Authenticated Physical or E-License,' Vehicle Color not matching visual color observed by Officer, Vehicle Operating Mode not matching visual operating mode observed by Officer, Altered VISOP, Altered Physical or E-License, VISOP not transmitting at all, VISOP transmitting someone faked a Physical license or E-License, VISOP transmitting an altered onboard license reader, altered VOA or VISOP, VISOP reporting a license plate number that is not matching up with a VIN or not matching up with a correct make or model.

System 100 communications can be based on Wi-Fi, Bluetooth Class 1 or 2, a cellular radio system, Citizens Band (CB) radio, satellite communications networks, and the like. System 100 can operate using network 102, e.g., a cellular telephone infrastructure that enables communications between VOA 150, VISOP 130, and LEO 104 so long as the peers are within range of the cellular telephone infrastructure. System 100 can operate with no network 102, where the VOA 150 communicates peer-to-peer with the VISOP 130, which communicates peer-to-peer with the LEO 104, e.g., using CB, Wi-Fi, or other types of communications that support peer-to-peer connections. The VISOP 130 can use a radius limit for communications, such as 500 feet or equivalent to line-of-sight for officers to witness moving violations, within which the VISOP 130 transmits peer-to-peer connection information to LEOs 104. Then LEO 104 can use a similar peer-to-peer connection radius for pairing with VISOP 130. When the radii overlap, the VISOP 130 and LEO 104 can establish the peer-to-peer connection and communicate. If the VISOP 130 detects an issue with the motor vehicle 101 (e.g., mismatch in the operator information 112 or vehicle identifying information 170, or other types of tampering or violations), the VISOP 130 can send a corresponding alert that is received by the LEO 104.

When using communications based on the cellular telephone infrastructure, connections with the VISOP 130 can be handed off from cell tower to cell tower. LEO vehicles can receive the transmissions when the motor vehicle's VISOP 130 is within a certain range. As the VISOP 130 drives past and beyond the range of that LEO's vehicle, the LEO's vehicle will no longer have access to read that motor vehicle's VISOP 130. The next LEO's vehicle that the VISOP 130 approaches will then start picking up the signal from the VISOP 130 and reading the relevant information until the VISOP 130 also is no longer within range of that next LEO's vehicle.

The VISOP 130 can inform the LEO 104 regarding many aspects of motor vehicle 101 and its operator, including: car-jacking/seat sensor and facial recognition (or other biometrics) process issues; driver seat sensor detecting the presence of an operator but who is not authorized or who does not match biometric identification, to stop carjacking or prevent starting; color changing vehicle status; shape shifting vehicle status; car mobile pay w/VMAC tied to payment transaction; moving vehicle information transmissions; LEO moving vehicle transmitted information; confining transmissions between the motor vehicle 101 and the LEO 104; identifying that the motor vehicle 101 is capable of color changing or shape changing; self-driving mode and self-reporting or transmission to LEO 104.

The motor vehicle 101 itself (e.g., via VISOP 130 or VOA 150) can inform the LEO 104 of such issues relevant to performing a traffic stop. The motor vehicle 101 can detect a violation and self-report to the LEO 104 while one or both vehicles are still in motion. The motor vehicle 101 can detect that an operator failed to authenticate or biometrically verify, and broadcast to LEOs in range that the motor vehicle 101 has been stolen. The motor vehicle 101 can inform the LEO 104 that it does not have authentication via this self-reporting capability. Embodiments allow for the self-reporting independent of whether the LEO 104 has additional a reasons to stop the motor vehicle 101.

Figure 2:
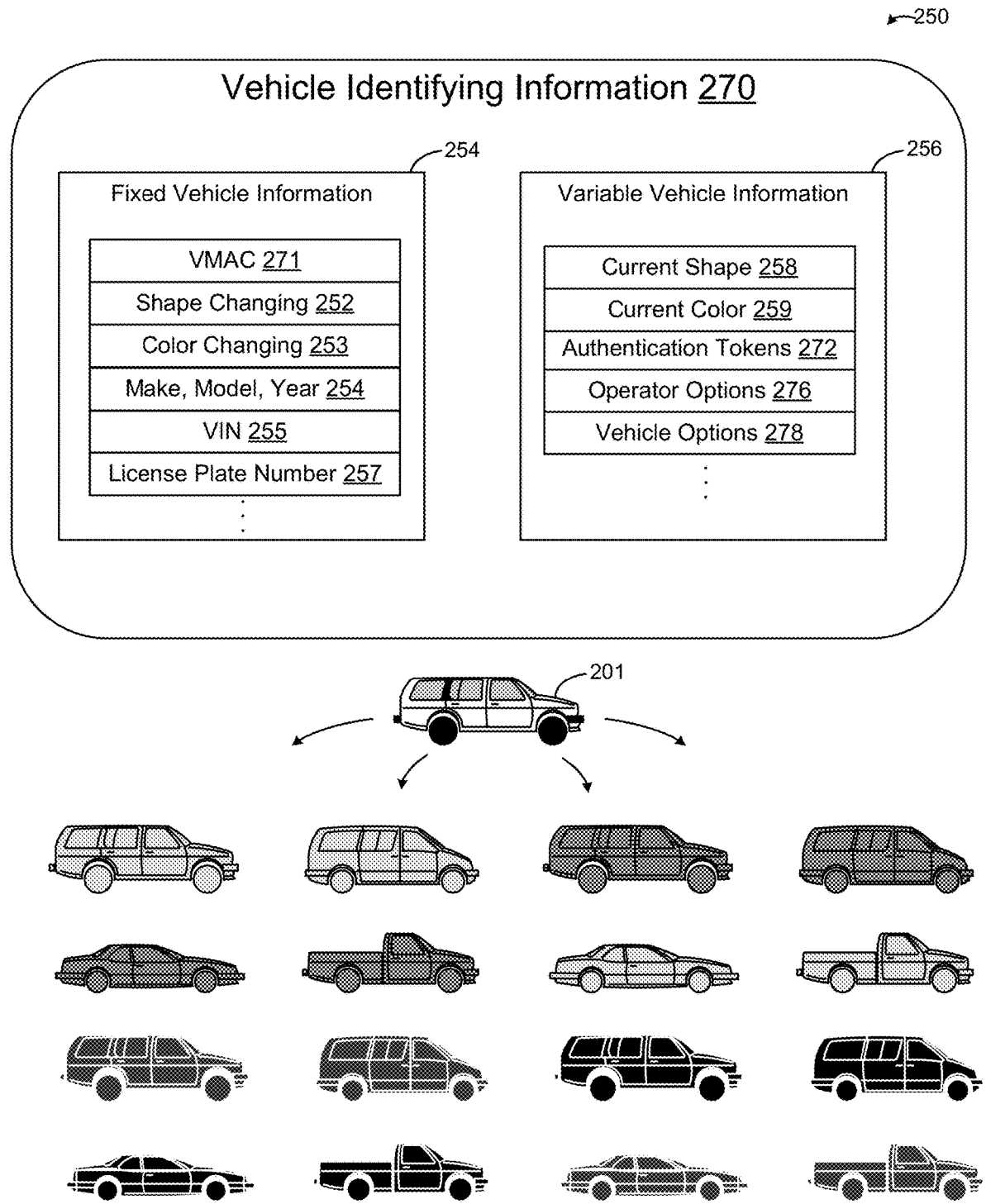
FIG. 2 illustrates a VOA including a diagram of vehicle information according to an embodiment.

FIG. 2 illustrates an example screen of the VOA 250 including a diagram of vehicle identifying information 270 according to an embodiment. The VOA 250 communicates with the vehicle's VISOP 130 to exchange information about the motor vehicle 201, to allow the owner to see a status of the motor vehicle 201 and manage the motor vehicle 201. The vehicle identifying information 270 includes a snapshot of the motor vehicle 201 for the owner to view, based on fixed vehicle information 254 and variable vehicle information 256. The VISOP 130 can store or transmit some or all of the illustrated information from the VOA 250. Such information can change based on the motor vehicle 201 having color changing or shape changing capabilities, such as transforming between the illustrated SUV configuration, a van configuration, a pickup truck configuration, or sedan configuration, and corresponding different colors.

The VISOP 130 selectively allows the motor vehicle 201 to be started, based on authenticating and approving the operator as set forth above. Additionally, the motor vehicle 201 can include capabilities allowing color or shape/configuration changes. The VISOP or VOA ties the operator information, information from the driver's license as well as other information such as operator options 276, to the motor vehicle. When operating the motor vehicle, the vehicle information is also tied to the motor vehicle's VISOP onboard system. The VIN 255, make, model, year 254, license plate number 257, and other identifying information for that motor vehicle are tied and associated with the VMAC 271. The motor vehicle has a complete information package on who is operating the motor vehicle, based on operator information and vehicle identifying information 270. The VISOP 130 can compare the operator information to the vehicle identifying information 270 to determine whether 1) the operator is legally allowed to drive the motor vehicle, and 2) whether the motor vehicle is color/shape changing, and its current status of color/shape or other variable vehicle information 256.

The VISOP 130 can broadcast some of the vehicle identifying information 270. In an embodiment, prior to a traffic stop, the VISOP 130 can broadcast some or all of the fixed vehicle information 254, and some of the variable vehicle information 256, that would otherwise be in plain view and visible to the public. In response to being pulled over (e.g., the LEO electronically communicates the need to pull over to the motor vehicle remotely), the VISOP 130 can transmit additional information, such as the variable vehicle information 256 or the operator information 112. This enables the LEO to have relevant information promptly and as needed. The LEO can use the operator information 112, or the vehicle identifying information 270 from the VISOP 130 or VOA 250, to access the MVD systems such as the NCIC or state-specific CIC to verify the received information and access other relevant information, such as when the LEO runs the license plate number through the state's information centers or systems.

The operator information 112 and the vehicle identifying information 270 informs the LEO before making a traffic stop, providing additional information to the LEO for allowing a fully-informed decision as to whether a traffic stop will even be needed. This system enables the LEO to make safer decisions, based on additional data from the operator information 112 and the vehicle identifying information 270 that would otherwise be unavailable until after approaching the vehicle and interacting directly with the vehicle's operator. This provides an opportunity for increased safety for the LEO and the public, because the LEO can decide whether to seek a safer environment to conduct the traffic stop, or whether to call for backup and pull over the motor vehicle in a safer position. The operator information 112 and the vehicle identifying information 270 provide the LEO with context for a more informed decision on how to engage with the operator.

The VMAC 271 is a Vehicle Media Access Control (VMAC) address. The motor vehicle's VISOP 130 or VOA can be tied to a dedicated VMAC address that is unique to that motor vehicle. The VMAC is a unique alphanumerical attribute that is used to identify the vehicle's individual electronic identification on a network. In an embodiment, the VMAC is based on a MAC address of the communication unit 144 of the VISOP 130. The VISOP 130 can use at least a portion of the VMAC 271 to serve as the motor vehicle's internet protocol (IP) address when communicating via Wi-Fi. The VISOP 130 can use the VMAC 271 in the data link layer of the network protocol layers for network communications.

The VMAC 271 serves as an electronic fingerprint of the motor vehicle, VISOP 130, or VOA 250. The VMAC 271 ties information and components to the motor vehicle. Communications from the VISOP 130 or VOA 250 received by the MVD, LEOs, or other recipients are tagged with the VMAC 271 specific to the motor vehicle, informing the recipients which motor vehicle sent the communications. Accordingly, recipients can cross-reference the VMAC 271 with a registration database to confirm whether the physical motor vehicle matches the VMAC 271 assigned to that vehicle at registration. If a VISOP is improperly stolen or transferred to the wrong motor vehicle, the VMAC reveals the improper mismatch.

The VMAC 271 also can be referred to as a vehicle ID, and can be an alphanumeric string of sufficient length and complexity to ensure uniqueness among motor vehicles throughout the world. In an embodiment, the VMAC 271 (and any of the information) is encoded using a security protocol when storing or transmitting the VMAC 271, to resist tampering, hacking, spoofing, or other forms of misuse or fraud. The uniqueness of the VMAC 271 enables coexistence of many different motor vehicles on the same communication network, while avoiding networking collisions or other issues because each vehicle is uniquely identifiable on the network through the VMAC 271.

The VMAC 271 uniquely identifies the data sets from the VISOP 130 or VOA 250, including the authenticated operator information 112, the results of the biometric identification (e.g., biometric identification token 174), and the vehicle identifying information 270. The VMAC 271 ensures that the data sets can be transmitted while still being able to uniquely link the data sets to the particular motor vehicle and operator.

The VOA 250 can be an application running on the motor vehicle owner's smartphone or other electronic device. Accordingly, an embodiment of the VOA 250 enables the owner to know exactly who is operating the motor vehicle at a specific time or location. The VOA is in communication with the vehicle's VISOP 130, and the VOA or VISOP can log the motor vehicle's physical identification information. This information includes: the vehicle make, model, manufacture year 254, current color 259, Vehicle Identification Number (VIN) 255, issued Licenses Plate number 257, and other additional information such as current owner's insurance, current owners' registration information, current registration sticker physically on the license plate (front or rear of vehicle, state specific), and the like.

In an example usage scenario, the operator is the owner, who gets into their motor vehicle 201 and uses the motor vehicle's onboard computer to change the motor vehicle's color. The VISOP 130 is in communication with the onboard computer, to automatically detect the change. Accordingly, the VISOP automatically updates the vehicle identifying information 270 to reflect the new current color 259. The VISOP communicates with the motor vehicle's onboard computer constantly in real-time to update the operator information or vehicle identifying information automatically. In an embodiment, the VISOP, with owner permission, keeps one or more additional copies of the stored information, such as on the VOA or on a remote database in communication with the VISOP or VOA (e.g., a backend server providing networking infrastructure to maintain operations of the VOA or VISOP). The VOA 250 can be provided as a tablet or other dedicated electronic device that accompanies the capability kit of the VISOP.

The owner needs to authenticate with the MVD when registering a motor vehicle. This authenticates the owner to the motor vehicle as the owner, not merely as one of the potential operators who might borrow or otherwise operate the motor vehicle. Accordingly, the VISOP 130 or VOA 250 knows whether an operator is the owner, based on that registration. The owner can install the VOA 250 on their personal device and populate the owner information or vehicle information into the VOA 250, which is in communication with the VISOP 130 of the vehicle.

When an owner reports a sale of the motor vehicle to the MVD, the stored information can be cleared from the motor vehicle. The VISOP of the motor vehicle can see the new owner information when checking with the MVD. In an embodiment, if not already cleared, the motor vehicle can detect the reported sale in response to communicating with the MVD, and select the option to relinquish owner rights and self-wipe the stored settings and information. The system can display information that is already publicly available, but not personally identifiable information that would allow for identify theft. The owner relinquishment process wipes any such information.

In an embodiment, the motor vehicle can self-report. The VOA and VISOP can have some information that is manually inputted or entered by the owner or operator, can have some information from the MVD (which can be manually entered or automatically entered), and can have some information from the motor vehicle itself (which cannot be manually entered). So, if the motor vehicle is a color changing motor vehicle, the VISOP and VOA will know that fixed vehicle information from the factory, by communicating with the motor vehicle's onboard computer. When the authenticated operator uses the motor vehicle's head unit or onboard computer to change color, change operating mode, or the like, the onboard computer and therefore the VISOP or VOA will have such vehicle identifying information 270. The VISOP can be linked to the vehicle's onboard computer, such as the electronic control module (ECM) of the motor vehicle's system or the vehicles onboard computer, from a few different perspectives. The VISOP or VOA can therefore obtain the operator's input on how they are using the motor vehicle, such as by selecting a color change to make motor vehicle a white color. The motor informs the VISOP or VOA that the vehicle is operating in white mode. A similar approach can be used with the shape-shifting status of the vehicle, or other aspects of the vehicle that can be changed or customized. Embodiments also allow the VISOP or VOA to obtain information from the MVD or other remote server, or from the onboard computer of the motor vehicle itself, without a need for input from the operator. If the information in the motor vehicle is tampered with, the VISOP can detect the mismatch and can transmit an error mode or other indication (suspected theft) that something is not right about the motor vehicle. For example, the VISOP can detect that the motor vehicle is saying that it is operating in white mode configuration, but has been hacked into a yellow mode (or operating in sedan shape mode but hacked into pickup shape mode).

In an embodiment, the motor vehicle can control who is authorized to install the VOA ownership app. For example, the VOA application can require a user to authenticate the application with specific vehicle registration information available only to the owner having access to the motor vehicle or MVD account. The VISOP of the motor vehicle can include information pertaining to how many people have ownership rights as indicated in the MVD registration records.

Figure 3:
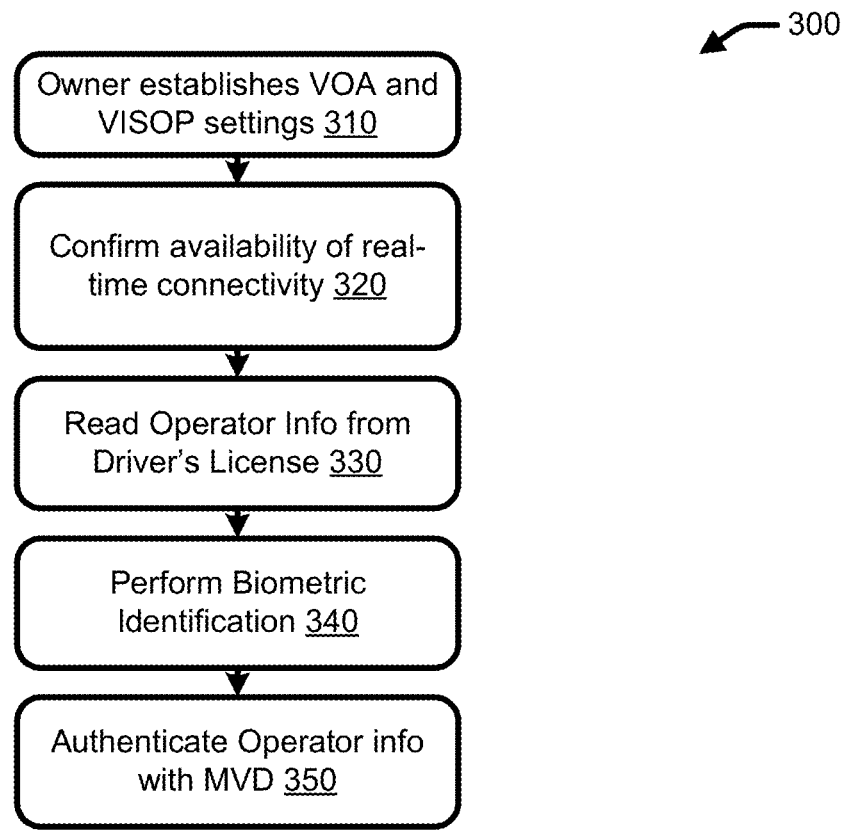
FIG. 3 illustrates a flowchart to authenticate operator information according to an embodiment.

FIG. 3 illustrates a flowchart 300 to authenticate operator information according to an embodiment. At 310, the owner establishes settings for the VOA and VISOP. For example, the owner registers a purchased vehicle with the MVD, providing authentic identifying information to the MVD. The motor vehicle then communicates with the MVD to establish authentic information about the owner or vehicle. The owner also can manually enter vehicle information or owner information, using the VOA to communicate with the VISOP of the vehicle. The VISOP or VOA also can obtain information from the vehicle itself (via vehicle integration with the vehicle's onboard computer) or from the operator (reading the operator's biometric information) or presented documents (card reader to read operator information from a presented driver's license). At 320, the VISOP conforms availability of real-time connectivity. For example, the VISOP uses a communication unit to detect availability of a cellular telephone network infrastructure. This enables the VISOP to communicate with the MVD to transmit and receive operator information, vehicle information, and authentication. In situations where the VISOP does not detect connectivity, the VISOP can use stored authentication tokens, or perform local verifications such as biometric comparisons between biometrics sensed from the operator and stored biometric information on a driver's license physically presented to a reader of the VISOP in the vehicle. The VISOP also can detect whether there is connectivity available to communicate with an LEO, and use an appropriate form such as network-based communication or peer-to-peer communication between the VISOP and the LEO. At 330, the VISOP reads operator information from a driver's license. For example, the VISOP includes a card reader to accept a driver's license and electronically read information from the driver's license. Such reading can include RFID for reading electronically, or optical to scan a one-dimensional or two-dimensional barcode encoded on the driver's license. In an embodiment, the VISOP includes an RFID reader to obtain operator information from the embedded chip of a passport. At 340, the VISOP performs biometric identification. For example, the VISOP is in electronic communication with a fingerprint reader installed on the steering wheel, or the VISOP includes a fingerprint reading touch pad on a user interface of the VISOP. The VISOP also may use a camera to visualize the operator for purposes of facial recognition. In other embodiments, the VISOP may use other forms of biometric verification such as retina scan, palm scan, or other biometrics. At 350, the VISOP authenticates operator information with the MVD. For example, the VISOP uses the network infrastructure conformed at 320 in order to communicate with authentication services hosted by the MVD to check the collected operator information for validity and any conflicts or issues. Responsive to the VISOP authenticating the operator information and verifying biometric identification, the VISOP informs the motor vehicle's onboard computer to allow the motor vehicle to be started and operated consistent with any configured permissions or options for the operator or motor vehicle. In situations where real-time connectivity infrastructure is not available, the VISOP can still verify that an operator is approved, through the use of stored tokens in the VISOP (or stored on the VOA which can locally communicate with the VISOP using RFID, Bluetooth, Wi-Fi, or other local peer-to-peer communication that does not require communication infrastructure outside of the motor vehicle).

When real-time connectivity is available, authenticating the operator information with the MVD can involve transmitting the operator information, from the driver's license, to the MVD for authentication. In an embodiment, authenticating involves: Verifying that this is a valid license and not expired with MVD; Verifying this person has the correct endorsements to operate this make and model of vehicle with MVD; Verifying this person does not have legal restrictions currently levied against them that would prevent them from operating at the present time.

When real-time connectivity is not available, authentication can include: Transmitting and receiving MVD authentication tokens to or from the VOA approved token package stored in the VOA device to or from the VISOP of the motor vehicle. The token package can include: 1. MVD Authentication 2. The owner's additional settings being approved or denied via the VOA.

The VISOP can verify the driver's license physically presented to operate the vehicle, e.g., by using an encryption/decryption or other security scheme to locally verify authenticity of the driver's license that the VISOP is presented with for reding.

The VISOP also can verify that the owner has not used the VOA to customize the operator options 276 or the vehicle options 278 to restrict this operator's use of this motor vehicle. If the owner has any relevant restrictions on this person or vehicle configured in the VOA, then the VISOP could potentially authenticate and recognize the presented license as valid for the operator, yet still not allow this authenticated operator to start the vehicle due to the operator options 276 or the vehicle options 278.

Embodiments allow for the use of an e-key, which can be a token stored on an electronically-readable card, or can include a key fob with RFID capabilities and storage to store tokens or additional information. The e-key can be used to unlock or start the vehicle, and also can be used to store authentication/verification tokens. In an embodiment, the MVD token package can be stored on the physical e-key, or the authorized operator's smartphone or other device running a copy of the VOA that is approved by the owner and that can sync-up with the VISOP upon detection and approval by the VISOP communicating with the copy of the VOA.

In an embodiment, the VOA or VISOP can authenticate the driver license to the operator by using a PIN (e.g., in lieu of, or in addition to, the biometric identification to match the operator to the license). For example, the owner can use the VOA or VISOP to register their driver's license with a PIN, to be used when authenticating the link between the operator and the driver's license presented when attempting to operate the motor vehicle, which reduces the risk of unauthorized use of a person's driver's license in attempts to operate the motor vehicle.

The VOA allows the vehicle's owner(s) to be informed of exactly who is operating the motor vehicle at this specific time, where they are operating this motor vehicle, and its current location, as well as in what physical configuration (sedan or truck if shape shifting) and what is the current color setting (if a color changing vehicle).

In an embodiment, the VISOP or VOA obtains the authentication from the MVD in the form of an authentication token that indicates yes or no regarding approval. The personally identifiable information (PII) of the operator does not need to be stored in the VISOP, VOA, or e-key pertaining to the operator's use of the motor vehicle. Rather, the system can operate by merely storing the authentication token indicating that the operator is authenticated and approved. A prospective guest operator can use a copy of the VOA on their personal device to submit their personal information to the MVD for authentication without exposing that information to the owner, the vehicle, or the e-key. The guest operator can receive the authentication token back from the MVD onto the copy of the VOA on the guest's personal device. The guest operator also or alternatively can request, via the copy of the VOA in communication with the vehicle's VISOP, that the MVD deliver the authentication token directly to the VISOP of the motor vehicle. The physical information from the driver's license does not need to be loaded or stored on the motor vehicle or its systems. Rather, the driver's license information can be referenced only for the purpose of generating the authentication token. The authentication token can be encoded as a one-time use that is very secure and automatically expires which the VISOP or VOA automatically discards upon expiration. The VISOP of the motor vehicle can look up information from multiple different sources including the MVD or others. The biometric reference photograph of the operator can be pulled from the MVD digital records.

Figure 4:
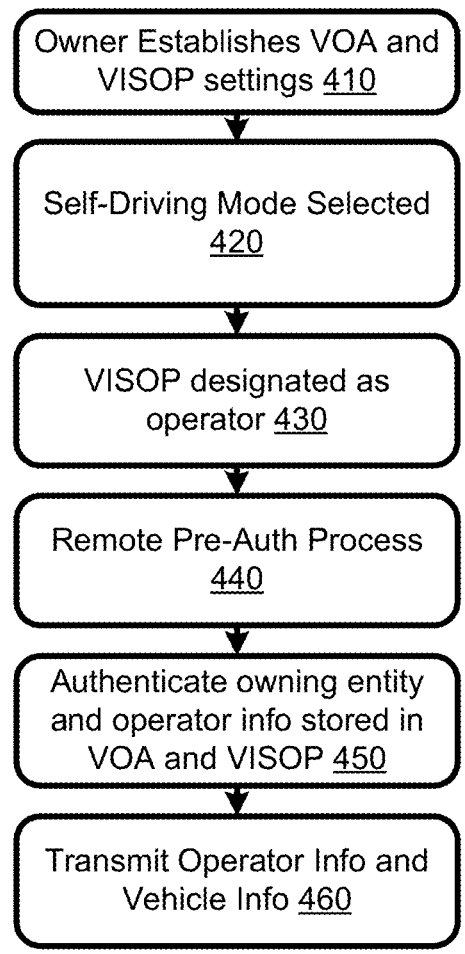
FIG. 4 illustrates a flowchart to authenticate operator information according to another embodiment.

FIG. 4 illustrates a flowchart 400 to authenticate operator information according to another embodiment. The authentication involves a self-driving autonomous (SDA) mode of the motor vehicle. At 410, the owner establishes settings in the VOA and VISOP of the motor vehicle. For example, the owner of the vehicle registers the motor vehicle with the MVD and registers the VOA with the VISOP of the motor vehicle. The owner also manually enters owner information or vehicle information into the VISOP, either directly or via the VOA. At 420, the owner can set the VOA to self-driving autonomous mode (SDA), if the motor vehicle has that capability as indicated in the onboard computer of the motor vehicle in communication with the VISOP and VOA. Responsive to selecting SDA, at 430, the VISOP designates itself as the operator. The VISOP authenticates the operator as the Owning Entity of Record for liability purposes. At 440, the VISOP performs a remote pre-authentication process in which the SDA Mode bypasses a requirement for the operator to undergo MVD authentication and biometric identification. For example, the VISOP uses a self-driving mode authentication token in lieu of an MVD authentication token. In the SDA Mode, the VISOP indicates, via vehicle information such as vehicle options 278, that the motor vehicle is operating in SDA Mode. At 450, the VISOP can pre-authenticate the owning entity and operator information stored in the VOA and VISOP. For example, the VISOP can rely on stored tokens to verify whether the owner has approved the vehicle for SDA mode, and whether the owner has configured the operator options 276 to allow the operator's use of the vehicle, even for SDA mode where the operator does not actively drive the vehicle but rather passively sits. At 460, when communicating, the VISOP transmits the SDA Mode indication as the operator information 112, and also transmits the vehicle identification information 170.

Figure 5:
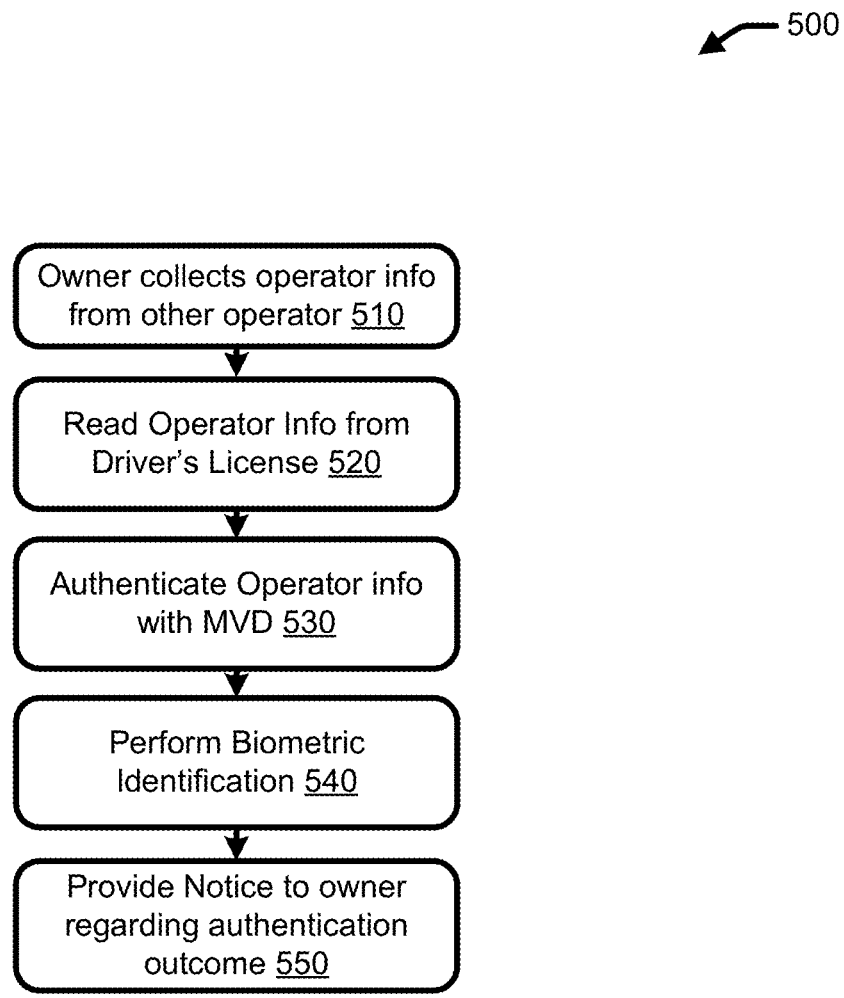
FIG. 5 illustrates a flowchart to authenticate operator information according to yet another embodiment.

FIG. 5 illustrates a flowchart 500 to authenticate operator information according to yet another embodiment. Flowchart 500 involves an owner authorizing an other operator using the motor vehicle, e.g., remote pre-authentication of the other operator. The owner has an option to pre-authenticate operator information from another operator separate from the motor vehicle. Referred to as a 'Remote Pre-Authentication' process, this enables the owner to pre-authenticate operator information, such as that from a physical or E-License, to the MVD in advance, regardless of whether the vehicle might have access to network infrastructure to authenticate information in real-time to the MVD. This option is available to the owner to pre-authenticate a potential operator of their respective vehicle where coverage is limited or non-existing for the vehicle. Additionally, it will allow the owner to pre-authenticate an operator and store this operator's information on the owners VOA or E-Key to the vehicle for convenience.

At 510, the owner collects operator information from the other operator. This can involve a key pre-authentication process, where the owner uses a computer smartphone, or the like to open the VOA application and load or link the other operator's information and then authenticate to MVD using the VOA application. At 520, the VOA reads the operator information from the driver's license of the other operator. In an embodiment the owner uses the VOA to electronically read the chipped physical license or E-License of the other operator and electronically obtain the other operator's information from the physical license or E-License, e.g., via an RFID reader of the smartphone running the VOA. In another embodiment, the owner uses the VOA to send a request message to the other owner (via email, text message, or the like), who responds by providing the operator information in a voluntary response sent to the VOA of the owner, or directly to the VISOP of the motor vehicle. At 530, the operator information is authenticated with the MVD. At this stage the process is occurring in advance of the other operator needing to enter or operate the motor vehicle, i.e., when the owner's VOA has connectivity. The owner can then submit the operator information of the other operator to the MVD for authentication, and store the pre-authenticated token from the MVD on the VOA on behalf of the operator. The owner can use the VOA to transfer that token to the VISOP of the motor vehicle or to an E-Key that operates the motor vehicle, by using the VISOP application to transfer tokens. Such approaches, including the programmed E-Key, enable the authentication token to be presented to the vehicle, even without using a network infrastructure (e.g., presenting the E-key or VOA to the vehicle so they can communicate with each other peer-to-peer such as Bluetooth, RFID, Wi-Fi, or the like). The vehicle VISOP, or the owner's E-Key of the motor vehicle, will then have the pre-authenticated authorization token loaded for future use. When the pre-approved operator eventually enters the motor vehicle, the motor vehicle will recognize the pre-authenticated token and proceed to the next stage. At 540, the VISOP of the motor vehicle performs biometric identification. For example, the VISOP verifies that the operator in the vehicle matches with the pre-authorized token stored at or presented to the VISOP, using biometric identification such as facial recognition, fingerprint scan, or the like responsive to the other operator presenting their driver's license to the VISOP of the motor vehicle. Upon verification, the VISOP of the motor vehicle allows this operator to use the vehicle, based on satisfying the pre-authentication, the various vehicle options and operator options, the VOA settings, and the pre-authenticated token stored on the VISOP or E-Key. At 550, the VISOP provides notice to the owner's VOA regarding authentication outcome. This notice can be held in an outbound notification queue until the motor vehicle enters an area that has network connectivity to allow communications between the VISOP and the VOA.

The MVD pre-authentication allows for the MVD pre-authenticated token to be stored onto the E-Key by the owner. The Vehicle's Operating Application (VOA) reads the E-Key and authorizes this person to operate based on the pre-authentication from the owner and loaded on the E-Key. The VISOP of the motor vehicle can run a pre-installed self-contained facial recognition program on the VISOP, to compare the pre-installed physical license or E-License photo which can be stored on the authenticated token that can be stored on the E-Key, to confirm the person sitting in the driver's seat of the vehicle matches the stored pre-authenticated physical license or E-License on the E-Key. The VISOP can use a built-in or after-market Vehicle Facial Camera, such as a universal serial bus (USB) camera, to view the person in driver's seat and facially compare the image to the stored digital picture on the physical license or E-License stored on the presented E-Key. In embodiments, other forms of biometric identification can be performed, such as fingerprint, retina scan, or the like.

In an embodiment, the vehicle owner's own physical license or E-License operator information and/or a pre-authenticated token for the owner are stored on the owner's VOA or E-Key, in case the motor vehicle is not within range of communication infrastructure or otherwise suffers a failure of the communication equipment. Accordingly, the owner will have an option to immediately drive and operate their own vehicle, regardless of network coverage.

An aspect of pre-authentication, as illustrated in flowchart 500, is the risk that the operator's status or information could change after obtaining the pre-authentication, in a manner that might affect whether the operator could obtain authentication with the changed status. A change in the person's MVD or legal status may prevent the operator from being allowed to legally operate a vehicle. The E-Key Pre-Authentication method is a snapshot in time, and may be prevented from authenticating with the MVD in real-time due to lack of available network coverage. In such situations, the owner can invalidate the stored pre-authentication tokens, such as by removing the existing authentication from the E-Key, which removes the driving privileges for that operator. The owner also has the option to log onto the Vehicle's Operating App (VOA) and lock out that operator's information or E-License. Such remedies also can address the risk of unauthorized operation, where a pre-authenticated operator, whose pre-authenticated token is loaded on the owners E-Key, could steal the E-Key and use the vehicle without permission of the owner. Furthermore, the owner can impose additional pre-loaded options or conditions, such as imposing an 'Authorized Usage Time/Window' by using their Vehicles Operators Application (VOA) to add the options/conditions for that particular operator.

Figure 6:
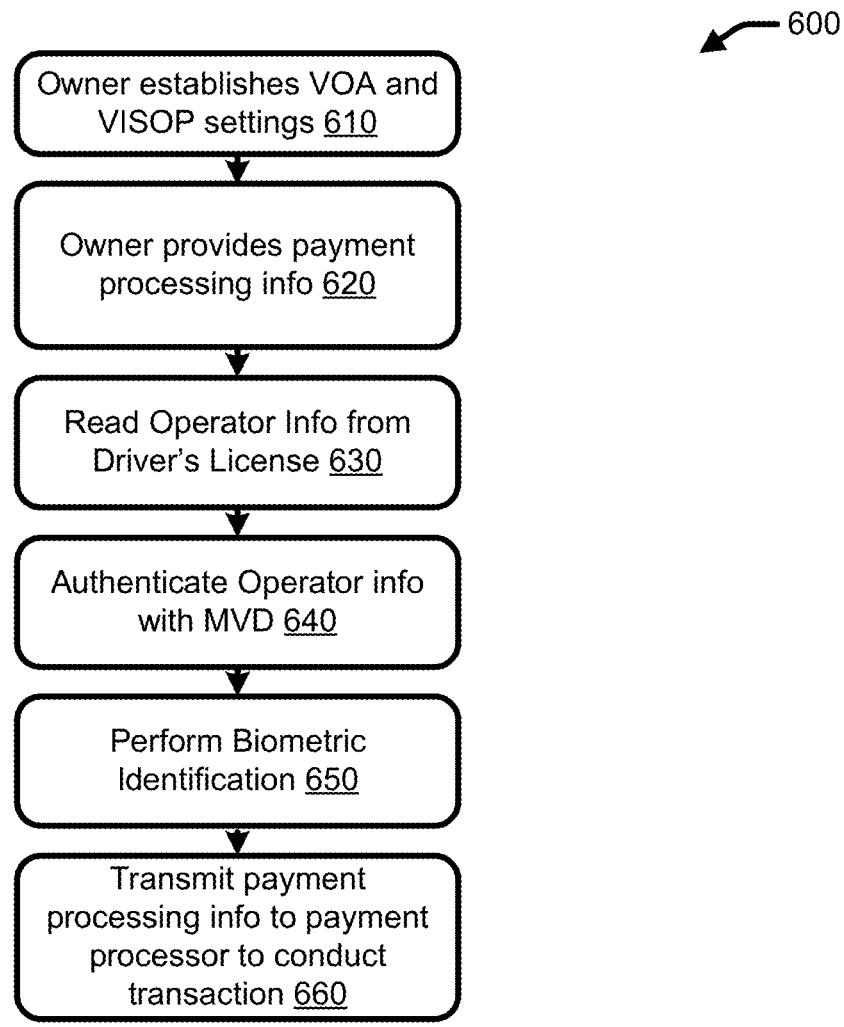
FIG. 6 illustrates a flowchart to transmit payment processing information according to an embodiment

FIG. 6 illustrates a flowchart 600 to transmit payment processing information according to an embodiment. At 610, the owner establishes VOA and VISOP settings. For example, the owner registers the motor vehicle and installs the VOA to configure the operator information and vehicle identification information. At 620, the owner provides payment processing information 179. For example, the owner uses the VOA installed on their smartphone to specify a credit card form of payment, including the account information for that credit card as used by payment processing vendors. The owner operator then uses the motor vehicle. At 630, the VISOP reads the operator information from the owner's driver's license as presented to the VISOP when seated in the motor vehicle, as described above. At 640, the VISOP authenticates the operator information with the MVD, as described above when network infrastructure is available. If not available, the VISOP authenticates the operator information by verifying the authenticity of a stored authentication token, e.g., loaded from the owner's VOA or e-key. At 650 the VISOP performs biometric identification to ensure that the person sitting in the vehicle matches the license presented to the VISOP. The biometric identification can be performed as set forth above, based on facial recognition, fingerprint recognition, or the like. At 660, upon successfully authenticating and recognizing the owner, the VISOP transmits the payment processing information to a payment processor to conduct the financial transaction.

Such transactions can be applied to other services, such as: Pay for Parking, HOV Sensors, Toll Sensors, Paying for Gas at a Gas Station, or Paying for food in a drive thru.

The VOA app allows owners or authorized operators to load their payment cards, and the VISOP or VOA can beam the payment information. This enables operators or owners of motor vehicles to have their vehicle beam the payment information, e.g., for paying at a parking garage, or paying a toll, or the like. In an embodiment, the VOA and VISOP can link the payment information to have the VISOP use its communication unit 144 as a transponder used in other systems, e.g., the transponder system used for accessing HOV lanes. Thus, instead of needing to get multiple transponders for multiple motor vehicles, the VISOP of the motor vehicle itself can serve as a transponder to beam communications with transponder systems such as HOV toll lane transponder infrastructure. The VISOP can serve as the device for the hardware support of wireless payments. The motor vehicle has access to the payment information via the VISOP communicating with the VOA app running on the owner's smartphone or similar device.

Figure 7:
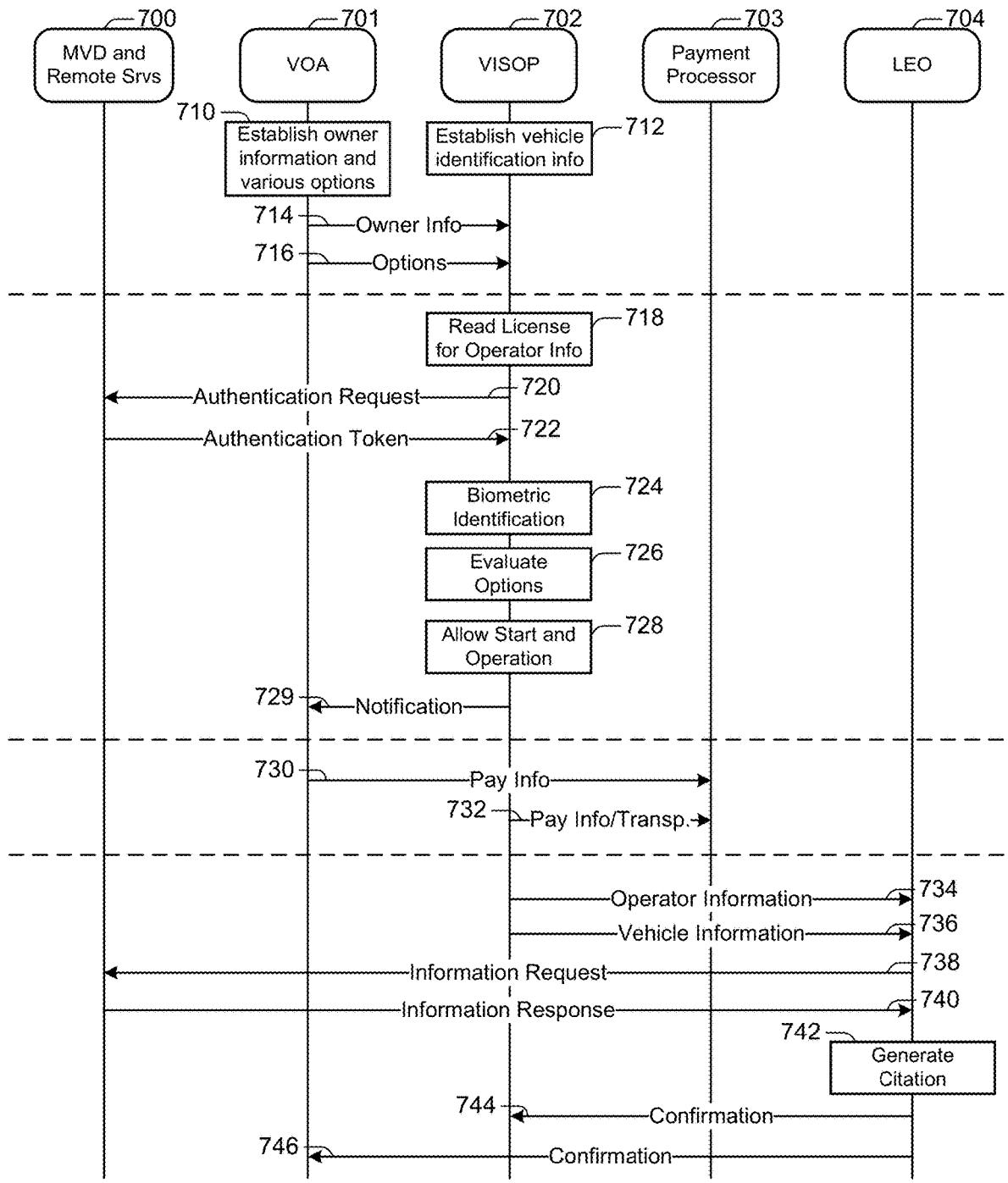
FIG. 7 illustrates a decision diagram to authenticate operator information according to an embodiment.

FIG. 7 illustrates a decision diagram to authenticate operator information according to an embodiment. Communications are illustrated between the MVD and other remote servers 700, VOA 701, VISOP 702, Payment Processor 703, and LEO 704. At 710, the VOA 701 establishes owner information, along with various options such as the options for other operators and conditions on using the motor vehicle, as well as payment information such as credit card account information. For example, the operator installs the VOA 701 as an app on a smartphone, and sets up the application including specifying conditions and options as desired and set forth above. At 712, the VISOP 702 establishes vehicle identification information. For example, the VISOP 702 obtains such information from the onboard computer, or head unit, of the motor vehicle as set forth above. At 714 and 716, the VOA 701 transmits the owner information and options to the VISOP 702. For example, the VOA communicates with the VISOP to synchronize the various owner preferences and conditions between the VOA and VISOP.

At 718, the VISOP 702 reads the license of a potential operator to obtain their operator information. The VISOP 702 can read the license according to the techniques as set forth above. The VISOP 702 then transmits an authentication request 720 to the MVD 700, which returns an authentication token 722. The illustrated embodiment corresponds to an online authentication, according to which the VISOP 702 is within range of communication infrastructure, so that the VISOP 702 can communicate with the MVD 700. In alternate embodiments, where the VISOP 702 is not within communication range, the VISOP 702 can read the authentication token from other sources, e.g., stored on the VOA 701, stored on the VISOP 702 in advance, stored on an E-key, and so on as set forth above. The VISOP 702 performs biometric identification 724 as set forth above, to verify that the operator presenting the driver's license to the VISOP 702 actually matches the identity of the driver's license. The VISOP 702 evaluates options 726, to determine whether any of the various options set by the VOA at 710 apply to this particular operator or this particular motor vehicle that the operator is attempting to operate. Upon satisfying the MVD authentication of operator information, and biometric identification, and various options, the VISOP 702 allows the operator to start and operate the vehicle at 728. Based on the configured preferences that the operator configured at 710, the VISOP 702 sends a notification 729 to the VOA 701, to inform the owner using the VOA application that an operator has successfully started and operated the motor vehicle.

At 730, the VOA 701 transmits payment information, as established at 710, to a payment processor 703. Alternatively or additionally, at 732, the VISOP 702 transmits the payment information to the payment processor 703. The VISOP 702 also can serve as a transponder to facilitate payments with the payment processor 703 as set forth above.

At 734 and 736, the VISOP transmits operator information and vehicle information to an LEO 704 that is within visual range of the motor vehicle containing the VISOP 702, as set forth above. The LEO 704 then transmits and information request to the MVD 700 or other remote server, such as criminal databases, to determine if the information that the LEO 704 received triggers any infractions, citations, or other actions. At 742, the LEO 704 generates a citation based on the received information and responses. The LEO 704 then electronically issues the citation and confirmations to the VISOP 702 and the VOA 701.

Figure 8:
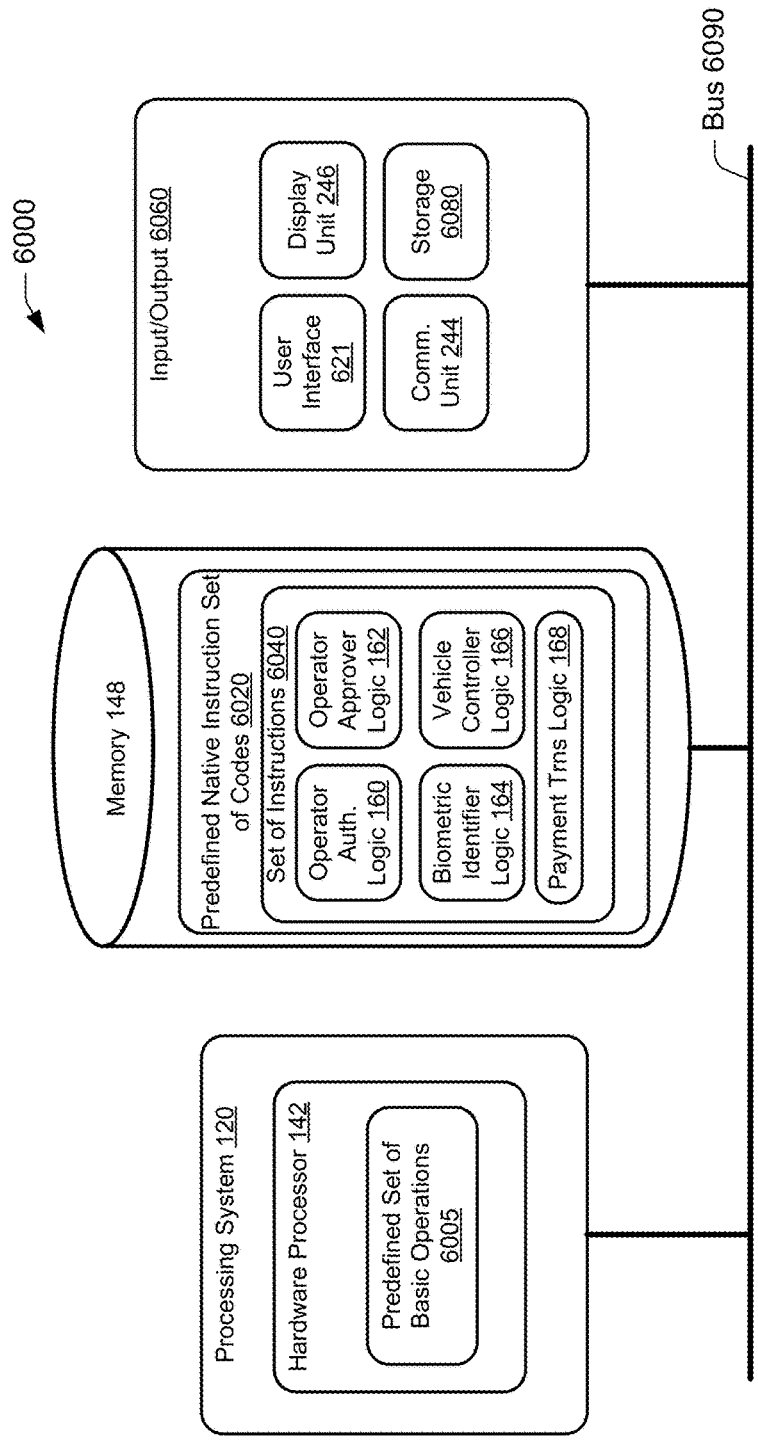
FIG. 8 illustrates a computing system including logic according to an embodiment.

FIG. 8 illustrates a computing system 6000 including logic according to an embodiment. The computer system 6000 includes a processing system 120, memory 148, and input/output module 6060 communicatively coupled via bus 6090. The processing system 120 includes hardware processor 142. The hardware processor 142 includes predefined set of basic operations 6005. The memory 148 includes predefined native instruction set of codes 6020. The predefined native instruction set of codes 6020 includes a set of instructions 6040. The set of instructions 6040 includes operator authenticator logic 160, operator approver logic 262, biometric identifier logic 264, vehicle controller logic 166, and payment transactor logic 168. The input/output 6060 includes user interface 621, display unit 246, communication unit 244, and storage 6080. In an embodiment, such components may serve as the computer system including the logic that carries out the methods described herein.

Certain attributes, functions, steps of methods, or sub-steps of methods described herein may be associated with physical structures or components, such as a module of a physical device that, in implementations in accordance with this disclosure, make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth so as to function as a special purpose computer with the ascribed characteristics. For example, in embodiments a module may comprise a functional hardware unit (such as a self-contained hardware or software or a combination thereof) designed to interface the other components of a system such as through use of an API. In embodiments, a module is structured to perform a function or set of functions, such as in accordance with a described algorithm. This disclosure may use nomenclature that associates a component or module with a function, purpose, step, or sub-step to identify the corresponding structure which, in instances, includes hardware and/or software that function for a specific purpose. For any computer-implemented embodiment, "means plus function" elements will use the term "means;" the terms "logic" and "module" and the like have the meaning ascribed to them above, if any, and are not to be construed as means.

To the extent the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. To the extent headings are used, they are provided for the convenience of the reader and are not to be taken as limiting or restricting the systems, techniques, approaches, methods, devices to those appearing in any section. Rather, the teachings and disclosures herein can be combined, rearranged, with other portions of this disclosure and the knowledge of one of ordinary skill in the art. It is the intention of this disclosure to encompass and include such variation. To the extent any elements or steps are described as "optional," it does not indicate that all or any other elements or steps are mandatory.

What is claimed is:

1. A system to authenticate operators of motor vehicles, comprising:
   a computer system installable in a motor vehicle, including:
      a processing system having a hardware processor configured to perform a predefined set of basic operations by loading corresponding ones of a predefined native instruction set of codes, the predefined native instruction set of codes constituting a set of instructions selectable for execution by the hardware processor;
      a memory accessible to the processing system; and
      a user interface controller under control of the processing system;
   user interface logic, stored in the memory, comprising a sequence of instructions selected from the predefined native instruction set of codes of the hardware processor, adapted to operate with the processing system and the user interface controller to implement a user interface adapted to prompt for user input and receive the user input;
   operator authenticator logic, stored in the memory, comprising a respective sequence of instructions selected from the predefined native instruction set of codes of the hardware processor, adapted to authenticate operator information with a Motor Vehicle Department (MVD);
   operator approver logic, stored in the memory, comprising a respective sequence of instructions selected from the predefined native instruction set of codes of the hardware processor, adapted to determine, based on operation of the operator authenticator logic and evaluation of vehicle identifying information pertaining to the motor vehicle, whether the operator is approved to operate the motor vehicle;
   biometric identifier logic, stored in the memory, comprising a respective sequence of instructions selected from the predefined native instruction set of codes of the hardware processor, adapted to perform biometric identification to verify that a driver's license matches the operator;
   vehicle controller logic, stored in the memory, comprising a respective sequence of instructions selected from the predefined native instruction set of codes of the hardware processor, adapted to:
      prevent the motor vehicle from starting, responsive to the operator not being approved to operate the motor vehicle; and
      allow the motor vehicle to start, responsive to the operator being approved to operate the motor vehicle;
      pre-authenticate, using a Vehicle's Operating Application (VOA), the operator information with the MVD;
      store an authentication token indicative of the pre-authenticating from the MVD;
      transfer the authentication token from the VOA to a Vehicle Identification and Secure Operating Program (VISOP); and
      authenticate the operator information by referencing the authentication token instead of the MVD; and
   payment transactor logic, stored in the memory, comprising a respective sequence of instructions selected from the predefined native instruction set of codes of the hardware processor, adapted to transmit elected information including payment information to conduct a transaction with a wireless payment system.

2. The system of claim 1, further comprising reporting logic, stored in the memory, comprising a respective sequence of instructions selected from the predefined native instruction set of codes of the hardware processor, adapted to cause the computing system to self-report by initiating, via the VISOP, a transmission of motor vehicle current operating status including a Vehicle's Media Access Control (VMAC) address of the motor vehicle when wirelessly transmitting operator information and self-reporting to a passing LEO, the transmission including vehicle identifying information, the transmission being readable by Law Enforcement Officers (LEOs) and sufficient to enable the LEO to determine, based on self-transmitted information the LEO receives pertaining to the authenticated operator and vehicle identifying information pertaining to the motor vehicle, whether the LEO is to engage in an official Law Enforcement engagement stop, and where to engage corresponding to a level of safety.

3. A method to authenticate operators of motor vehicles, comprising:
   obtaining, based on a driver's license, operator information of an operator of a motor vehicle;
   authenticating, by a Vehicle Identification and Secure Operating Program (VISOP) running on an onboard computer of the motor vehicle, the operator information with a Motor Vehicle Department (MVD);
   determining, based on the authenticating and vehicle identifying information pertaining to the motor vehicle, whether the operator is approved to operate the motor vehicle;
   performing biometric identification to verify that the driver's license matches the operator;

preventing the motor vehicle from starting, responsive to the operator not being approved to operate the motor vehicle; and allowing the motor vehicle to start, responsive to the operator being approved to operate the motor vehicle;

pre-authenticating, using a Vehicle's Operating Application (VOA), the operator information with the MVD;

storing an authentication token indicative of the pre-authenticating from the MVD;

transferring the authentication token from the VOA to the VISOP; and authenticating the operator information by referencing the authentication token instead of the MVD.

4. The method of claim 3, wherein biometric identification comprises performing at least one of: facial recognition or fingerprint recognition to match biometrics of the operator.

5. The method of claim 3, further comprising transmitting, by the VISOP, a self-reporting alert that indicates to LEOs that the motor vehicle is compromised, based on operating with at least one of an unauthenticated operator, incorrect color, incorrect shape, being reported as stolen, or being tampered with.

6. The method of claim 3, further comprising:
adding a Vehicle's Media Access Control (VMAC) address to the operator information that has been authenticated, wherein the VMAC is a unique identifier that is tied to the motor vehicle and cannot be modified by the operator; and
transmitting the operator information with the VMAC, for use by law enforcement officers (LEOs).

7. The method of claim 3, further comprising:
storing vehicle identifying information, wherein the vehicle identifying information is tied to a current status of the motor vehicle and cannot be modified by the operator;
including a Vehicle's Media Access Control (VMAC) address with the vehicle identifying information, the VMAC being a unique identifier that is tied to the motor vehicle and cannot be modified by the operator; and
transmitting the vehicle identifying information with the VMAC, for use by LEOs.

8. The method of claim 7, wherein the vehicle identifying information comprises at least one of: an indication that the motor vehicle is color changing and a current color of the motor vehicle, or an indication that the motor vehicle is shape changing and a current physical configuration of a shape of the motor vehicle.

9. The method of claim 3, further comprising:
checking, while the motor vehicle is running, that the operator is approved to operate the motor vehicle; and
safely disabling the motor vehicle responsive to the operator not being approved to operate the motor vehicle.

10. The method of claim 3, further comprising:
storing, by a Vehicle's Operating Application (VOA), elected information including payment information;
transmitting the elected information from the VOA to the VISOP; and
transmitting, by the VISOP, the elected information to conduct a transaction with a wireless payment system.

11. The method of claim 3, further comprising:
detecting, by the VISOP, that the motor vehicle is to operate in a Self-Driving Autonomous (SDA) mode;
bypassing, by the VISOP, a need for authenticating operator information and performing biometric identification; and
transmitting, as the operator information, an indication that the vehicle is operating in SDA mode.

12. The method of claim 3, further comprising obtaining the operator information by securely reading, via an electronic reader coupled to the VISOP, the operator information from a physical license or an Electronic License (E-License).

13. The method of claim 3, further comprising pre-authenticating and storing on the VISOP authentication tokens corresponding to multiple operators.

14. The method of claim 3, further comprising:
associating an expiration time limitation with the authentication token on the VISOP; and
expiring the authentication token according to the expiration time limitation.

15. The method of claim 3, further comprising:
setting, on a per-operator basis, an activity time limitation associated with the authentication token on the VISOP;
allowing the motor vehicle to start when a current time satisfies the activity time limitation; and
preventing the motor vehicle from starting when the current time does not satisfy the activity time limitation.

16. The method of claim 3, further comprising requiring two-factor authentication prior to allowing the motor vehicle to start, based on authenticating the operator information from the driver's license with the MVD, and verifying operator information including at least one of a password or personal identification number (PIN).

17. The method of claim 3, further comprising configuring the VISOP of the motor vehicle with a lock option that requires physical presence of an E-Key originally provided with the motor vehicle.

18. The method of claim 3, further comprising configuring the VISOP of the motor vehicle with a block operator option that prevents the motor vehicle from starting when a predesignated blocked operator attempts to authenticate, based on preconfiguring the VISOP with a reference to the predesignated blocked operator.

19. The method of claim 3, further comprising configuring the VISOP of the motor vehicle with a locked option that prevents the motor vehicle from starting regardless of operator, based on preconfiguring the VISOP to enable the locked option.

20. The method of claim 3, further comprising configuring the VISOP of the motor vehicle with an automatic shut-off option that shuts off the motor vehicle when an authenticated physical license or E-License, which was used to start the motor vehicle, is no longer detected in the motor vehicle.

21. The method of claim 3, further comprising configuring the VISOP of the motor vehicle with a re-authentication option that allows the motor vehicle to remain running but prevents the motor vehicle from being driven when a verified biometric identification, which was used to start the motor vehicle, is no longer detected in the motor vehicle, the VISOP being configured to allow the motor vehicle to be driven when the verified biometric identification is re-authenticated after being no longer detected.

22. The method of claim 3, further comprising configuring the VISOP of the motor vehicle with a maintenance mode option that allows the motor vehicle to be started into a maintenance mode, without authenticating the operator information or performing biometric identification, the maintenance mode allowing the vehicle to be operated locally for maintenance activities.

23. The method of claim 3, further comprising configuring the VISOP of the motor vehicle with a notification mode option that causes the VISOP to send an alert notification to an owner of the motor vehicle responsive to an attempt to start the vehicle, the alert notification including a date, time, and location of the attempt to start the vehicle, along with an indication of the driver's license if used in the attempt to start the vehicle.

24. The method of claim 3, wherein:
authenticating the operator information comprises verifying the operator has been issued a valid license from the MVD that is not expired; and
determining whether the operator is approved to operate the motor vehicle comprises determining that the operator possesses correct endorsements to operate a make and a model of the motor vehicle, and determining whether the operator has any legal restrictions currently levied against them that would prevent operation of the motor vehicle at a present time.

* * * * *